(12) United States Patent
Puskas

(10) Patent No.: US 6,181,051 B1
(45) Date of Patent: Jan. 30, 2001

(54) APPARATUS AND METHODS FOR CLEANING AND/OR PROCESSING DELICATE PARTS

(76) Inventor: William L. Puskas, P.O. Box 1676, New London, NH (US) 03257

( * ) Notice: Under 35 U.S.C. 154(b), the term of this patent shall be extended for 0 days.

(21) Appl. No.: 09/066,158

(22) Filed: Apr. 24, 1998

Related U.S. Application Data

(63) Continuation-in-part of application No. 08/718,945, filed on Sep. 24, 1996, now Pat. No. 5,834,871.
(60) Provisional application No. 60/023,150, filed on Aug. 5, 1996.
(51) Int. Cl.$^7$ ................................................. H01L 41/06
(52) U.S. Cl. ...................................... 310/316.01; 310/317
(58) Field of Search ............................. 310/317, 316.01, 310/334

(56) References Cited

U.S. PATENT DOCUMENTS

| Re. 25,433 | 8/1963 | Rich . | |
|---|---|---|---|
| 2,585,103 | 2/1952 | Fitzgerald | 99/250 |
| 2,891,176 | 6/1959 | Branson | 310/8.1 |
| 2,985,003 | 5/1961 | Gelfand | 68/3 |

(List continued on next page.)

FOREIGN PATENT DOCUMENTS

| 29 50 893 | 12/1979 | (DE) . |
| 0 123 277 | 10/1984 | (EP) . |
| 1 256 188 | 12/1971 | (GB) . |
| 1 323 196 | 7/1973 | (GB) . |
| 1 331 100 | 9/1973 | (GB) . |

(List continued on next page.)

*Primary Examiner*—Mark O. Budd
(74) *Attorney, Agent, or Firm*—McDermott, Will & Emery

(57) ABSTRACT

The invention utilizes harmonics of certain clamped ultrasound transducers to generate ultrasound within the liquid of an ultrasonic tank and in a frequency range of between about 100 khz to 350 khz (i.e., "microsonic" frequencies). The application of microsonic frequencies to liquid preferably occurs simultaneously with a sweeping of the microsonic frequency within the transducer's harmonic bandwidth to reduce or eliminate (a) standing waves within the liquid, (b) other resonances, (c) high energy cavitation implosion, and (d) non-uniform sound fields, each of which is undesirable for cleaning and/or processing of semiconductor wafers and other delicate parts. The invention can also drive ultrasonic transducers such that the frequency of applied energy has a sweep rate within the ultrasonic bandwidth of the transducers; and that sweep rate is also varied so that the sweep rate is substantially non-constant during operation. This reduces or eliminates resonances which are created by transducers operating with a single sweep rate. An ultrasound generator of the invention sometimes utilizes amplitude modulation (AM), and the AM frequency is swept over time so as to reduce resonances. AM control is preferably provided by selecting a portion of the rectified power line frequency. In applications which utilize multiple generators, multiple transducers, and one or more tanks, simultaneously, the invention synchronizes the operation of the generators to a common FM signal to reduce beat frequencies between generators. Each such generator can also be adjusted, through AM, to control the process characteristics within the associated tank. Two or more transducers are sometimes used by the invention, in combination, to broaden the overall bandwidth of acoustical energy applied to the liquid around the primary frequency or one of the harmonics. The bandwidths of the transducers are made to overlap such that an attached generator can drive the transducers, in combination, to deliver ultrasound to the liquid in a broader bandwidth. In a single chamber ultrasound system, two or more generators, each operating or optimized to generate a different range of frequencies, are connected to a multiplexer; and the desired frequency range is selected, and hence the right generator, according to the cavitation implosion energy that is desired within the tank chemistry.

21 Claims, 17 Drawing Sheets

U.S. PATENT DOCUMENTS

| | | | |
|---|---|---|---|
| 3,066,232 | 11/1962 | Branson | 310/8.7 |
| 3,094,314 | 6/1963 | Kearney et al. | 259/72 |
| 3,113,761 | 12/1963 | Platzman | 259/72 |
| 3,152,295 | 10/1964 | Schebler | 318/118 |
| 3,187,207 | 6/1965 | Tomes | 310/8.7 |
| 3,230,403 | 1/1966 | Lewis et al. | 310/8.7 |
| 3,293,456 | 12/1966 | Shoh | 310/8.1 |
| 3,315,102 | 4/1967 | Quint et al. | 310/8.1 |
| 3,318,578 | 5/1967 | Branson | 259/1 |
| 3,371,233 | 2/1968 | Cook | 310/8.1 |
| 3,433,462 | 3/1969 | Cook | 259/1 |
| 3,629,726 | 12/1971 | Popescu | 331/116 M |
| 3,638,087 | 1/1972 | Ratcliff | 318/118 |
| 3,648,188 | 3/1972 | Ratcliff | 330/26 |
| 3,651,352 | 3/1972 | Puskas | 310/8.1 |
| 3,690,333 | 9/1972 | Kierner | 134/95 |
| 3,727,112 | 4/1973 | Popescu | 317/146 |
| 3,735,159 | 5/1973 | Murry | 310/8.3 |
| 3,746,897 | 7/1973 | Karatjas | 310/8.1 |
| 3,778,758 | 12/1973 | Carson | 310/10 |
| 3,804,329 | 4/1974 | Martner | 239/4 |
| 3,842,340 | 10/1974 | Brandquist | 321/45 R |
| 3,893,869 | 7/1975 | Mayer et al. | 134/86 |
| 3,975,650 | 8/1976 | Payne | 310/8.1 |
| 4,044,297 | 8/1977 | Nobue et al. | 323/4 |
| 4,054,848 | 10/1977 | Akita | 331/116 R |
| 4,069,444 | 1/1978 | Heim | 318/114 |
| 4,081,706 | 3/1978 | Edelson | 310/316 |
| 4,109,174 | 8/1978 | Hodgson | 310/316 |
| 4,118,649 | 10/1978 | Shwartzman et al. | 310/337 |
| 4,120,699 | 10/1978 | Kennedy, Jr. et al. | 134/1 |
| 4,141,608 | 2/1979 | Breining et al. | 310/316 |
| 4,156,157 | 5/1979 | Mabille | 310/316 |
| 4,175,242 | 11/1979 | Kleinschmidt | 310/316 |
| 4,275,363 | 6/1981 | Mishiro et al. | 331/4 |
| 4,326,553 | 4/1982 | Hall | 134/153 |
| 4,391,672 | 7/1983 | Lehtinen | 162/192 |
| 4,398,925 | 8/1983 | Trinh et al. | 55/15 |
| 4,409,999 | 10/1983 | Pedziwiatr | 134/95 |
| 4,418,297 | 11/1983 | Marshall | 310/316 |
| 4,431,975 | 2/1984 | Polesny | 331/117 R |
| 4,527,901 | 7/1985 | Cook | 366/127 |
| 4,543,130 | 9/1985 | Shwartzman | 134/1 |
| 4,554,477 | * 11/1985 | Ratcliff | 310/317 X |
| 4,559,826 | 12/1985 | Nelson | 73/632 |
| 4,633,119 | 12/1986 | Thompson | 310/325 |
| 4,736,130 | * 4/1988 | Puskas | 310/317 X |
| 4,743,789 | 5/1988 | Puskas | 310/316 |
| 4,788,992 | 12/1988 | Swainbank et al. | 134/64 R |
| 4,804,007 | 2/1989 | Bran | 134/184 |
| 4,836,684 | 6/1989 | Javorik et al. | 366/114 |
| 4,854,337 | 8/1989 | Bunkenberg et al. | 134/184 |
| 4,864,547 | 9/1989 | Krsna | 367/137 |
| 4,869,278 | 9/1989 | Bran | 134/184 |
| 4,979,994 | 12/1990 | Dussault et al. | 134/1 |
| 4,998,549 | 3/1991 | Bran | 134/184 |
| 5,037,208 | 8/1991 | Dussault et al. | 366/127 |
| 5,037,481 | 8/1991 | Bran | 134/1 |
| 5,090,432 | 2/1992 | Bran | 134/139 |
| 5,109,174 | * 4/1992 | Shewell | 310/317 |
| 5,119,840 | 6/1992 | Shibata | 134/184 |
| 5,143,103 | 9/1992 | Basso et al. | 134/98.1 |
| 5,148,823 | 9/1992 | Bran | 134/184 |
| 5,201,958 | 4/1993 | Breunsbach et al. | 134/1 |
| 5,218,980 | * 6/1993 | Evans | 310/317 X |
| 5,247,954 | 9/1993 | Grant et al. | 134/184 |
| 5,276,376 | 1/1994 | Puskas | 310/317 |
| 5,286,657 | 2/1994 | Bran | 437/9 |
| 5,305,737 | 4/1994 | Vago | 601/4 |
| 5,355,048 | 10/1994 | Estes | 310/334 |
| 5,365,960 | 11/1994 | Bran | 134/184 |
| 5,496,411 | 3/1996 | Candy | 134/1 |
| 5,534,076 | 7/1996 | Bran | 134/1 |
| 5,834,871 | * 11/1998 | Puskus | 310/317 X |

FOREIGN PATENT DOCUMENTS

| | | |
|---|---|---|
| 1 488 252 | 10/1977 | (GB) . |
| 2 060 220 | 4/1981 | (GB) . |
| 2 097 890 | 11/1982 | (GB) . |
| 2 161 037 | 1/1986 | (GB) . |
| 2 170 663 | 8/1986 | (GB) . |

* cited by examiner

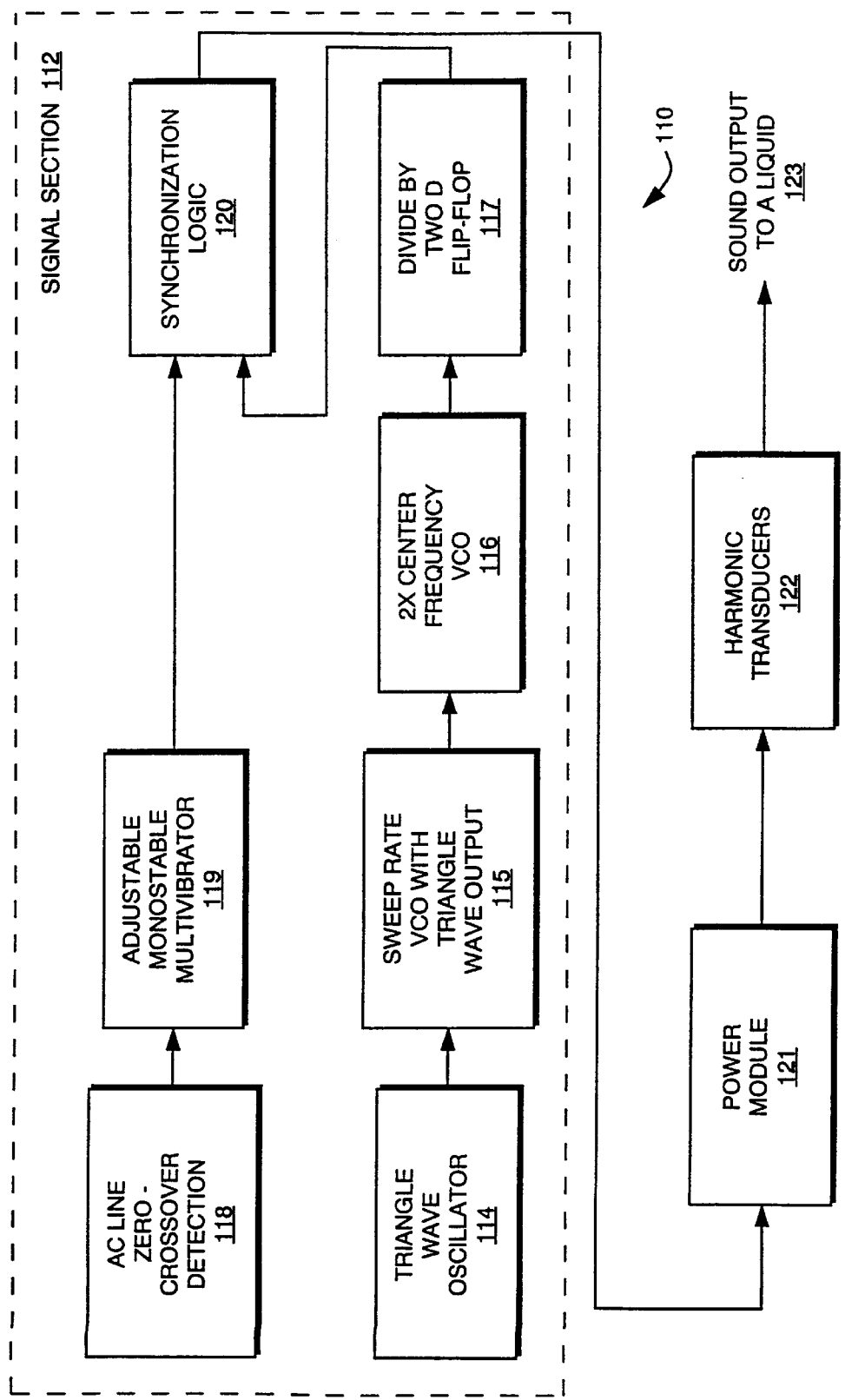

TO FIG. 5B

FROM FIG. 5A

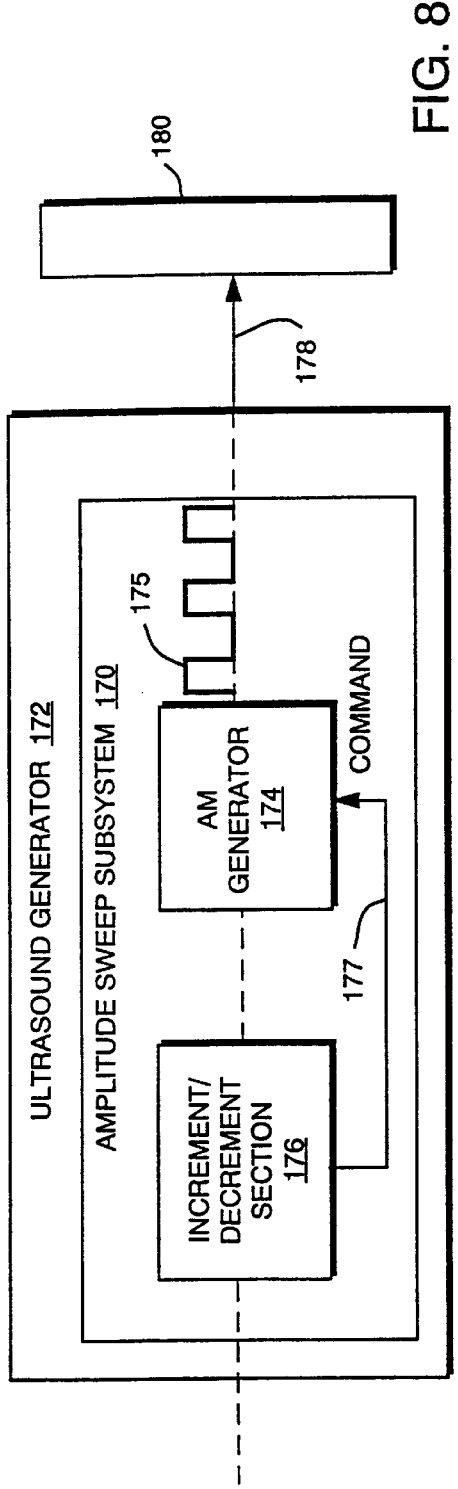
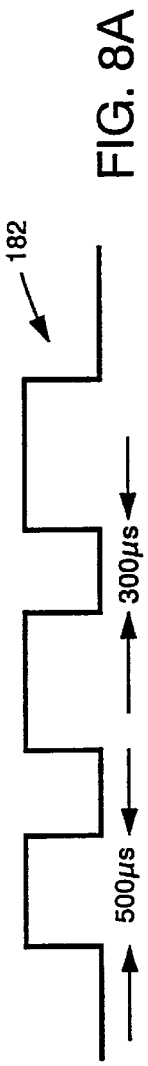
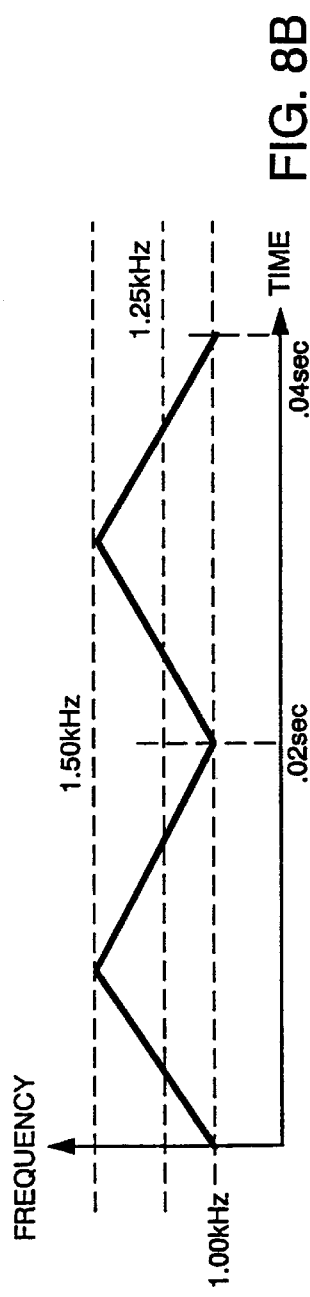
FIG. 8
FIG. 8A
FIG. 8B

APPARATUS AND METHODS FOR CLEANING AND/OR PROCESSING DELICATE PARTS

RELATED APPLICATIONS

This application is a continuation-in-part of Provisional Application No. 60/023,150, filed on Aug. 5, 1996, and entitled "Apparatus and Methods for Processing and Cleaning Semiconductor Wafers and Other Delicate Parts," and a continuation of U.S. patent application Ser. No. 08/718,945 filed Sep. 24, 1996 now U.S. Pat. No. 5,834,871.

FIELD OF THE INVENTION

The invention relates to systems and methods for cleaning and/or processing delicate parts, e.g., semiconductor wafers. In particular, the invention relates to ultrasonic systems, ultrasonic generators, ultrasonic transducers, and methods which support or enhance the application of ultrasonic energy within liquid.

BACKGROUND OF THE INVENTION

Ultrasonic energy has many uses; and applications of ultrasound are widespread in medicine, in the military industrial complex, and in engineering. One use of ultrasound in modern manufacturing and processing is to process and/or clean objects within liquids. For example, it is well-known that objects within an aqueous solution such as water can be cleaned by applying ultrasonic energy to the water. Typical ultrasound transducers are, for example, made from materials such as piezoelectrics, ceramics, or magnetostrictives (aluminum and iron alloys or nickel and iron alloys) which oscillate with the frequency of the applied voltage or current. These transducers transmit ultrasound into a tank filled with liquid that also covers some or all of the object to be cleaned or processed. By driving the transducer at its operational resonant frequency, e.g., 18 khz, 25 khz, 40 khz, 670 khz or 1 Mhz, the transducer imparts ultrasonic energy to the liquid and, hence, to the object. The interaction between the energized liquid and the object create the desired cleaning or processing action.

By way of example, in the 1970s ultrasonic energy was used in liquid processing tanks and liquid cleaning tanks to enhance the manufacture of semiconductor devices and other delicate items. The typical ultrasonic frequency of such processes was a single frequency between 25 khz to 50 khz. Many prior art generators exist which produce single frequency ultrasonics, including those described in U.S. Pat. Nos. 3,152,295; 3,293,456; 3,629,726; 3,638,087; 3,648,188; 3,651,352; 3,727,112; 3,842,340; 4,044,297; 4,054,848; 4,069,444; 4,081,706; 4,109,174; 4,141,608; 4,156,157; 4,175,242; 4,275,363; and 4,418,297.

The early ultrasonic transducers were typically piezoelectric ceramics that were "clamped," i.e., compressed, so as to operate at their fundamental resonant or anti-resonant frequency. Many prior art clamped transducers exist, including those found in U.S. Pat. Nos. 3,066,232; 3,094,314; 3,113,761; 3,187,207; 3,230,403; 3,778,758; 3,804,329 and RE 25,433. Other ultrasound transducers are made of alloys that possess magnetostriction properties which cause them to expand or contract under the influence of a magnetic field.

As mentioned above, these transducers were bonded to or placed in tanks which housed the cleaning or processing liquid. Typically, such tanks were constructed of a material compatible with the processing liquid, such as: 316L stainless steel for most aqueous chemistries; 304 stainless steel for many solvents; plastics such as Teflon, polypropylene, and metals such as tantalum for strong acids; and coated metals such as Teflon-coated stainless steel for corrosive liquids.

In order to deliver ultrasound to the solution within the tank, the transducers were attached to, or made integral with, the tank. In one method, for example, epoxy bonds or brazing were used to attach the transducers to tanks made of metallic stainless steel, tantalum, titanium, or Hastalloy. In another prior art method, the drive elements of the transducers were machined or cast into the tank material, and the piezoelectric ceramic and backplates were assembled to the drive elements.

The prior art also provides systems which utilize ultrasonic transducers in conjunction with plastic tanks. Typically, the tank's plastic surface was etched to create a surface that facilitated an epoxy bond thereon. The transducers were bonded with epoxy to the etched surface, and various techniques were used to keep the system cool to protect the plastic from deterioration. One such technique was to bond the transducers to an aluminum plate that would act as a heat-sink, and then to bond the aluminum plate to the plastic surface. Often, fans would be directed toward the aluminum plate and the transducers so as to enhance cooling. Another cooling technique utilized a thin plastic, or a process of machining the plastic at the transducer bonding position, to provide a thin wall at the transducer mounting position. This technique enhanced the cooling of the plastic and transducer by improved heat conduction into the liquid, and further improved the coupling of sound into the processing liquid because of less sound absorption.

With advances in plastic formulations such as PEEK (polyetheretherketone), the prior art made improvements to the plastic ultrasonic tank by further reducing the sound absorption within the plastic material. The prior art further developed techniques for molding the transducers into the plastic material, such as through injection and rotational molding, which further improved the manufacturing of the tank as well as the processing characteristics within the tank.

For other materials such as ceramics, glass, Pyrex and quartz, the prior art used epoxy to bond the transducer to the tank surface. Casting the transducer into the material was also possible, but was not commercially used. Often, the radiating surface (i.e., the surface(s) with the ultrasonic transducers mounted thereon or therein), usually the tank bottom, would be pitched by at lease one-quarter wavelength to upset standing wave patterns within the tank. Other tank configurations which provided similar advantages are reported in the prior art, such as disclosed by Javorik in U.S. Pat. No. 4,836,684.

An alternative to bonding the transducer directly to the bottom or sides of the tank was developed in the prior art by bonding the transducer to a window or plate that was sealed within a tank opening via a gasket. This had several advantages. If the transducer failed, or if cavitation erosion occurred within the radiating surface, the window or plate could be replaced without the expense of replacing the whole tank. Another advantage was the ability to use dissimilar materials. For example, a quartz tank with a tantalum window offered the advantage of an acid resistant material for the tank, and a metallic bonding and radiating surface for the transducer. In U.S. Pat. No. 4,118,649, Schwartzman described the use of a tantalum window with bonded transducers which coupled ultrasonic energy into a semiconductor wafer process tank.

A second alternative to direct bonding between the transducers and the tank was developed, in the prior art, by bonding the transducers inside a sealed container, called an "immersible" or "submersible," which was placed under the liquid in the process or cleaning tank. Certain advantages were also presented in this method, including (a) the relatively inexpensive replacement of the container, and (b) the use of dissimilar materials, described above. In U.S. Pat. No. 3,318,578, Branson discloses one such immersible where both the transducers and the generator are sealed in the container.

There are, however, certain disadvantages associated with above-described alternatives to direct bonding between the transducers and the tank. One such disadvantage is the occasional entrapment of contamination within the area of the window, or the window gasket, or under the immersible. When contamination-free processing is required, a direct bonded coved corner tank provides a better solution.

Although tanks, plates, windows and immersibles usually had clamped transducers bonded thereon, the prior art sometimes utilized an unclamped piezoelectric shape or an array of unclamped piezoelectric shapes, such as PZT-4 or PZT-8, which were bonded directly to the tank, plate, window or immersible. By way of example, U.S. Pat. No. 4,118,649 describes transducers shaped into hexagons, rectangles, circles, and squares and bonded to a window. These unclamped transducers had the advantage of lower cost. They further could be operated in either the radial mode, for low frequency resonance, or in the longitudinal mode for "megasonic" frequency resonance (i.e., "megasonic" frequencies generally correspond to those frequencies between about 600 khz and 2 Mhz).

Nevertheless, these prior art unclamped transducers proved to be less reliable as compared to prior art clamped transducers. Accordingly, these shaped transducer arrays were used primarily in low-cost bench-top ultrasonic baths, or in megasonic equipment where high frequency ultrasonic resonance was utilized. Still, these transducers proved to be particularly unreliable when operating at megasonic frequencies because of the high frequency stress affecting the ceramics.

One other system in the prior art used to couple acoustics into a liquid is commonly referred to as a "double boiler" system. In the double boiler system, an ultrasonic plate, tank, window or immersible transmits the ultrasonics into a coupling liquid. A processing tank, beaker or other container containing the processing or cleaning chemistry is then immersed into the coupling liquid. Accordingly, the ultrasound generated within the coupling liquid transmits into the tank containing the processing or cleaning liquid. The double boiler system has several advantages. One advantage is in material selection: the transducer support structure can be made out of an inexpensive material, such as stainless steel; the coupling liquid can be a relatively inert substance, such as DI water; and the process tank can be a material such as quartz or plastic material, which fares well with an aggressive chemistry such as sulfuric acid. Another advantage is that one transducer driving a relatively inert coupling liquid can deliver ultrasound into several different processing tanks, each containing different chemistries. Other advantages of the double boiler system are that the coupling fluid can be chosen so that its threshold of cavitation is above the cavitation threshold of the processing chemistry; and the depth of the coupling liquid can be adjusted for maximum transmission efficiency into the process tank(s). U.S. Pat. No. 4,543,130 discloses one double boiler system where sound is transmitted into an inert liquid, through a quartz window, and into the semiconductor cleaning liquid.

The prior art also recognizes multi-functional, single chamber ultrasonic process systems which deliver ultrasonic cleaning or processing to liquids. In such systems, the cleaning, rinsing, and drying are done in the same tank. Pedziwiatr discloses one such system in U.S. Pat. No. 4,409,999, where a single ultrasonic cleaning tank is alternately filled and drained with cleaning solution and rinsing solution, and is thereafter supplied with drying air. Other examples of single- chamber ultrasonic process systems are disclosed in U.S. Pat. Nos. 3,690,333; 5,143,103; 5,201,958, and German Patent No. 29 50 893.

In the prior art, "directed field tanks" are sometimes employed where the parts to be processed have fairly significant absorption at ultrasonic frequencies. More particularly, a directed field tank has transducers mounted on several sides of the tank, where each side is angled such that ultrasound is directed toward the center of the tank from the several sides. This technique is useful, for example, in supplying ultrasound to the center of a filled wafer boat.

In the late 1980s, as semiconductor device geometries became smaller, and as densities became higher, many shortcomings were discovered with respect to conventional low-frequency ultrasonic processing and cleaning of semiconductor wafers. The main disadvantage was that the existing ultrasound systems damaged the parts, and reduced production yields. In particular, such systems typically generated a sound wave with a single frequency, or with a very narrow band of frequencies. In many cases, the single frequency, or narrow band of frequencies, would change as a function of the temperature and age of the transducers. In any event, the prior art ultrasonic systems sometimes generated sufficient cycles of sound within a narrow bandwidth so as to excite or resonate a mode of the processed part. The relatively large displacement amplitudes that exist during such a mode resonance would often damage the delicate part.

Another disadvantage of single frequency ultrasound (or narrow band ultrasound) is the standing waves created by the resonances within the liquid. The pressure anti-nodes in this standing wave are regions of intense cavitation and the pressure nodes are regions of little activity. Therefore, undesirable and non-uniform processing occurs in a standing wave sound field.

In addition to the resonant and standing wave damages caused by single frequency ultrasound (or narrow band ultrasound), damages are also caused by (a) the energy levels of each cavitation implosion, and (b) by lower frequency resonances, each of which is discussed below.

The prior art methods for eliminating or reducing the damage caused by the energy in each cavitation implosion are well known. The energy in each cavitation implosion decreases as the temperature of the liquid is increased, as the pressure on the liquid is decreased, as the surface tension of the liquid is decreased, and as the frequency of the sound is increased. Any one or combination of these methods are used to decrease the energy in each cavitation implosion.

By way of example, one benefit in reducing the energy in each cavitation implosion is realized in the manufacture of hard disk drives for computers. The base media for a hard disk is an aluminum lapped and polished disk. These disks are subjected to 40 khz ultrasonic cleaning in aqueous solutions with moderate temperature, often resulting in pitting caused by cavitation that removes the base material from the surface of the aluminum disk. As discussed above, one solution to this problem is to raise the temperature of the aqueous solution to above 90° C. This causes the energy in each cavitation implosion to be less than the energy which typically removes base material from the aluminum disk. It is important, however, to keep the temperature below a value (typically 95° C.) which provides a cavitation implosion that is strong enough to remove the contamination. Another solution to the problem is to use a higher frequency ultrasound. A 72 khz ultrasonic system typically has the proper energy level in each cavitation implosion, with moderate temperature aqueous solutions, to remove contamination without removing base material from the lapped and polished aluminum disk.

In the prior art, wet bench systems often consist of several low frequency ultrasonic and/or megasonic tanks with different chemistries disposed therein. For example, a cleaning tank followed by two rinsing tanks, usually in a reverse cascading configuration, is a common wet bench configuration. In wet bench systems, there is an optimum value for the energy in each cavitation implosion: the highest energy cavitation implosion that does not cause cavitation damage to the part being processed or cleaned. However, because different chemistries are used in different tanks in the wet bench system, the energy in each cavitation implosion, for a given frequency, will be different in each tank. Therefore, not all tanks will have the optimum value of energy in each cavitation implosion. This problem has been addressed in the prior art by using different frequency ultrasonics in the different tanks. For example, the cleaning tank can have a chemistry with low surface tension, where a low frequency such as 40 khz gives the optimum energy in each cavitation implosion. The rinsing tanks, on the other hand, might use DI water, which has a high surface tension; and thus 72 khz ultrasonics may be needed to match the energy of the 40 khz tank for each cavitation implosion.

In single chamber process systems, different chemistries are pumped in and out of one tank. Because such process systems typically generate single or narrow band frequencies, or frequencies in a finite bandwidth, the energy in each cavitation implosion is optimum for one chemistry and not generally optimum for the other chemistries. Such systems are therefore relatively inefficient for use with many different chemistries.

Certain prior art ultrasonic systems generate ultrasonic frequencies in two or more unconnected frequencies, such as 40 khz and 68 khz. Although these systems had great commercial appeal, experimental results have showed little or no merit to these multi-frequency systems. Such systems tend to have all of the problems listed above, whereby the cleaning and damaging aspects of ultrasound are generally dependent upon a single frequency. That is, for example, if the higher frequency provides adequate cleaning, without damage, the lower frequency may cause cavitation damage to the part. By way of a further example, if the lower frequency provides cleaning without damage, then the higher frequency has little or no practical value.

Cavitation damage can also occur when the delicate parts are removed from an operating ultrasonic bath. This damage occurs when the ultrasound reflects off of the liquid-air interface at the top of the tank to create non-uniform hot spots, i.e., zones of intense cavitation. The prior art has addressed this problem by turning the ultrasonics off before passing a delicate part through the liquid-air interface.

Low frequency resonant damage is a relatively new phenomenon. The prior art has focused on solving the other, more significant problems—i.e., ultrasonic frequency resonance and cavitation damage—before addressing the low frequency resonant effects of an ultrasonic system. However, the prior art solutions to low frequency ultrasonic damage are, in part, due to a reaction to the problems associated with 25 khz to 50 khz ultrasound, described above. Specifically, the prior art has primarily focused on utilizing high frequency ultrasound in the processing and cleaning of semiconductor wafers and other delicate parts. These high frequency ultrasonic systems are single-frequency, continuous wave (CW) systems which operate from 600 khz to about 2 Mhz, a frequency range which is referred to as "megasonics" in the prior art.

One such megasonic system is disclosed in U.S. Pat. No. 3,893,869. The transducers of this system and other similar systems are typically 0.1 inch thick and are unclamped piezoelectric ceramics driven at their resonant frequency by a single frequency continuous-wave generator. All the techniques described above, e.g., material selections, tank configurations, and bonding techniques, and used with lower frequency ultrasonics were employed in the megasonic frequency systems of the prior art. For example, because of the aggressive chemistries used, quartz or Teflon tanks with a transducerized quartz window became a common configuration adapted from lower frequency ultrasonic systems.

As described earlier and disclosed in U.S. Pat. No. 4,118,649, the bonding of piezoelectric shapes to a tank, plate, window or immersible, by epoxy, were the common ways to integrate megasonic transducers within a treatment tank. One alternative is disclosed by Cook in U.S. Pat. No. 4,527,901, where the ceramic is fired, and then polarized, as part of the tank assembly. Another prior art alternative to the bonding a piezoelectric shape by epoxy is to mold or cast the piezoelectric shape into the product. For example, one prior art system utilizes a piezoelectric circle that has been injection-molded into a tank assembly. The prior art also suggests that a piezoelectric rectangle could be cast into a quartz window; however, in this case, poling or repoling the ceramic after casting may be necessary if it exceeds its curie point.

The megasonic systems of the prior art overcame many of the disadvantages and problems associated with 25 khz to 50 khz systems. First, because the energy in each cavitation implosion decreases with increasing frequency, damages due to cavitation implosion have been reduced or eliminated. Instead of cavitation implosion, megasonic systems depend on the microstreaming effect present in ultrasonic fields to give enhanced processing or cleaning. Resonant effects, although theoretically present, are minimal because the geometries of the delicate parts are typically not resonant at megasonic frequencies. As geometries become smaller, however, such as in state-of-the-art equipment, certain prior art megasonic systems have had to increase their operating frequencies to 2 Mhz or greater.

An alternative to higher frequency megasonics is to optimize the ultrasonic energies with amplitude modulation (AM) of a frequency modulated (FM) wave. Such systems operate by adjusting one of seven ultrasonic generator parameters—center frequency, bandwidth, sweep time, train time, degas time, burst time, and quiet time—to adjust one or more of the following characteristics within the liquid: energy in each cavitation implosion, average cavitation density, cavitation density as a function of time, cavitation density as a function of position in the tank and average gaseous concentration.

When megasonic systems became popular as a solution to cavitation and resonant damages caused by lower frequency ultrasonic systems, the prior art suggests that even higher frequencies be utilized in the removal of smaller, sub-micron particulate contamination. Recent data and physical understanding of the megasonic process, however, suggest that this is not the case. The microstreaming mechanism upon which megasonics depends penetrates the boundary layer next to a semiconductor wafer and relies on a pumping action to continuously deliver fresh solution to the wafer surface while simultaneously removing contamination and spent chemistry. Cleaning or processing with megasonics therefore depends upon (a) the chemical action of the particular cleaning, rinsing, or processing chemistry in the megasonics tank, and (b) the microstreaming which delivers the chemistry to the surface of the part being processed, rinsed, or cleaned.

However, because microstreaming is produced in all high intensity ultrasonic fields in liquids, it can be expected that submicron size particle removal will occur in any high intensity ultrasonic field. When experiments were done where the problems of non-uniformity, high cavitation energy, and resonance were overcome by ultrasonic techniques such as those taught by U.S. Pat. No. 4,736,130, the data showed effective submicron particle removal at all ultrasonic frequencies used for semiconductor wafer cleaning and processing.

One problem with prior art megasonic systems relates to the transducer design and operation frequency. In prior art megasonic systems, the commonly available 0.1 inch thick piezoelectric ceramic shapes are bonded to a typical tank or gasketed plate and have a fundamental resonant frequency in the 600 khz to 900 khz frequency range. The main difference between these megasonic transducers and the 25 khz or 40 khz transducers is that the lower frequency transducers are clamped systems, i.e., where the piezoelectric ceramic is always under compression, whereas the megasonic transducers are unclamped. Because the megasonic transducers are unclamped, the piezoelectric ceramics go into tension during its normal operation, reducing the transducer's reliability. This remains a significant problem with prior art megasonic systems.

More particularly, ceramic is very strong under compression, but weak and prone to fracture when put into tension. When a clamped transducer is made, the front driver and the backplate compress the piezoelectric ceramic by means of a bolt or a number of bolts. However, the front driver and the backplate become part of the piezoelectric resonant structure, and operate to lower the resonant frequency of the combined part. The prior art clamped ultrasonic transducer structures resonate at fundamental frequencies well below the megasonic frequencies, and generally at 90 khz and below.

Therefore, one significant problem with megasonic systems and equipment is overall reliability. The megasonic piezoelectric ceramic is put into tension at 600,000 times per second (i.e., 600 khz), at least, during operation. This tension causes the ceramics to crack because it weakens and fatigues the material with repeated cycles.

Two other problems of prior art megasonic systems relate to the nature of high frequency sound waves in a liquid. Sound waves with frequencies above 500 khz travel like a beam within liquid, and further exhibit high attenuation. This beam effect is a problem because it is very difficult to uniformly fill the process or cleaning tank with the acoustic field. Therefore, the prior art has devised techniques to compensate for the beam effect, such as by (a) spreading the sound around the tank through use of acoustic lenses, or by (b) physically moving the parts through the acoustic beam. The beam and attenuation effects of megasonic systems result in non-uniform processing, and other undesirable artifacts.

In the last ten years, several manufacturers of prior art ultrasonic systems have introduced frequency-sweeping ultrasonic generators with certain frequencies in the 25 khz to 72 khz frequency range. Such systems overcome many of the problems associated in the prior art. By way of example, many or all of the damaging standing waves and resonances are eliminated by these frequency-sweeping ultrasonic systems. These systems reduce resonant damages by sweeping the frequencies fast enough, and over a large enough bandwidth, so that it greatly reduces the likelihood of having resonances within the tank. A rapid frequency sweeping system generates each cycle of sound (or in some cases, each half cycle of sound) at a significantly different frequency from the preceding cycle of sound (or half cycle of sound). Therefore, the build up of resonant energy required to impart a resonance amplitude within the part rarely or never occurs.

Another advantage of frequency sweeping ultrasonic systems is that they increase the ultrasonic activity in the tank because there is less loss due to wave cancellation. One of the first frequency sweeping ultrasonic generators had a bandwidth of 2 khz, a sweep rate of 100 hz, and a center frequency of 40 khz. Accordingly, at a frequency change 400 khz per second—i.e., two kilohertz sweeping up from 39 khz to 41 khz, plus two kilohertz sweeping down from 41 khz to 39 khz, times 100 times per second equals 400 khz per second—the increased ultrasonic activity was able to cavitate semi-aqueous solvents which were previously impossible to continuously cavitate with commercially available conventional ultrasonic generators.

The frequency-sweeping activity in the prior art was so significant that by 1991 every major ultrasonic manufacturer was shipping 40 khz generators that changed frequency at frequency sweep rates of up to 4.8 Mhz per second. This rapid sweeping of frequency provided good ultrasonic activity even at continuous wave (CW) operation. By way of example, one 10 kilowatt, 40 khz generator in the prior art operated directly from a rectified three-phase power signal which provided a 800 khz per second CW frequency-sweeping system that had superior performance as compared to AM single frequency ultrasonic systems.

Although the main problems with lower frequency ultrasonics were solved by frequency sweeping, cavitation damage could occur in any process where the energy in each cavitation implosion was strong enough to remove an atom or a molecule from the surface of the semiconductor wafer or the delicate part. As disclosed in U.S. Pat. No. 4,736,130, system optimization at lower frequency ultrasonics permitted successful processing of many delicate parts because it was possible to maximize the microstreaming effects while minimizing adverse cavitation effects. However, the potential for cavitation damage remains a concern of the industry.

One important limitation to further improvement of ultrasonic processes is the low frequency and the narrow bandwidth of clamped piezoelectric transducers. For example, typical clamped or unclamped prior art transducers provide about 4 khz in overall bandwidth. One other important limitation of ultrasonic processes is that although amplitude control is known to be beneficial, inexpensive and uncomplicated ways of providing AM are generally not available.

Other problems exist in the prior art in that certain systems are driven by more than one ultrasonic generator. Such generators typically operate to either (a) drive the same tank, or (b) drive multiple tanks in the same system. Although the generators are typically set to the same sweep rate, the independent generators will never have exactly the same sweep rate. This causes another low frequency resonance problem within an ultrasonic tank or system. In addition, one problem with multiple tanks and multiple generators is that some of the ultrasound from one tank is coupled through connecting structure to the other tank(s). This creates unwanted cross-talk and negatively affects the desired cleaning or processing within the tank.

In particular, prior art multi-generator systems sometimes create an undesirable beat frequency which causes low frequency resonance in susceptible parts. For example, consider two sweeping frequency generators, each with sweep rates of approximately 10 hz sweeping over a bandwidth of 4 khz with a center frequency of 40 khz. Now consider a delicate part to be cleaned that has a low frequency resonance at one kilohertz. The following condition will occur periodically: one generator will be changing frequency from 38 khz to 41 khz, while the other generator is changing frequency from 39 khz to 42 khz. In this example, this will occur for about 37.5 milliseconds. Since the two frequencies in the tank or system are about one kilohertz apart, a beat frequency of about one kilohertz is produced. The period of one kilohertz is one millisecond, therefore a string of thirty-seven beats at about one kilohertz are produced. This is sufficient to setup a destructive resonance in a delicate part with a one kilohertz resonance It is, therefore, an object of the invention to provide ultrasonic systems which reduce or eliminate the problems in the prior art.

Another object of the invention is to provide improvements to ultrasonic generators, to transducers applying ultrasound energy to liquids, and to methods for reducing the damage to delicate parts.

It is still another object of the invention to provide methodology for applying ultrasound to liquid in a manner which is compatible with both the tank chemistry and the part under process.

Still another object of the invention to provide a method of supplying suitable energies in each cavitation implosion, in a single chamber process system, where different chemistries are used in different parts of the process.

Another object of the invention is to provide an ultrasonic generator that reduces the repetition of low frequency components from an ultrasonic bath to reduce or eliminate low frequency resonances within the bath.

One objective of this invention is to overcome certain disadvantages of prior art megasonic systems while retaining certain advantages of megasonic cleaning and/or processing.

It is a further objective of this invention to provide ultrasonic transducer arrays which supply ultrasonic energy with microstreaming and without significant cavitation implosion.

Still another object of this invention is to provide methodology of improved amplitude control in ultrasonic systems.

Another object of the invention is to provide systems which reduce or eliminate beating and/or cross-talk within a liquid caused by simultaneous operation of a plurality of generators.

These and other objects of the invention will be apparent from the description which follows.

SUMMARY OF THE INVENTION

As used herein, "ultrasound" and "ultrasonic" generally refer to acoustic disturbances in a frequency range above about eighteen kilohertz and which extend upwards to over two megahertz. "Lower frequency" ultrasound, or "low frequency" ultrasound mean ultrasound between about 18 khz and 90 khz. "Megasonics" or "megasonic" refer to acoustic disturbances between 600 khz and 2 Mhz. As discussed above, the prior art has manufactured "low frequency" and "megasonic" ultrasound systems. Typical prior art low frequency systems, for example, operate at 25 khz, 40 khz, and as high as 90 khz. Typical prior art megasonic systems operate between 600 khz and 1 Mhz. Certain aspects of the invention apply to low frequency ultrasound and to megasonics. However, certain aspects of the invention apply to ultrasound in the 100 khz to 350 khz region, a frequency range which is sometimes denoted herein as "microsonics."

As used herein, "resonant transducer" means a transducer operated at a frequency or in a range of frequencies that correspond to a one-half wavelength (k) of sound in the transducer stack. "Harmonic transducer" means a transducer operated at a frequency or in a range of frequencies that correspond to 1λ, 1.5λ, 2λ or 2.5λ of sound, and so on, in the transducer stack. "Bandwidth" means the range of frequencies in a resonant or harmonic region of a transducer over which the acoustic power output of a transducer remains between 50% and 100% of the maximum value.

As used herein, a "delicate part" refers to those parts which are undergoing a manufacture, process, or cleaning operation within liquid subjected to ultrasonic energy. By way of example, one delicate part is a semiconductor wafer which has extremely small features and which is easily damaged by cavitation implosion. A delicate part often defines components in the computer industry, including disk drives, semiconductor components, and the like.

As used herein, "khz" refers to kilohertz and a frequency magnitude of one thousand hertz. "Mhz" refers to megahertz and a frequency magnitude of one million hertz.

As used herein, "sweep rate" or "sweep frequency" refer to the rate or frequency at which a generator and transducer's frequency is varied. That is, it is generally undesirable to operate an ultrasonic transducer at a fixed, single frequency because of the resonances created at that frequency. Therefore, an ultrasonic generator can sweep (i.e., linearly change) the operational frequency through some or all of the available frequencies within the transducer's bandwidth at a "sweep rate." Accordingly, particular frequencies have only short duration during the sweep cycle (i.e., the time period for sweeping the ultrasound frequency through a range of frequencies within the bandwidth). "Sweep the sweep rate" or "double sweeping" or "dual sweep" refer to an operation of changing the sweep rate as a function of time. In accord with the invention, "sweeping the sweep rate" generally refers to the operation of sweeping (i.e., linearly changing) the sweep rate so as to reduce or eliminate resonances generated at the sweep frequency.

The present invention concerns the applied uses of ultrasound energy, and in particular the application and control of ultrasonics to clean and process delicate parts, e.g., semiconductor wafers, within a liquid. Generally, in accord with the invention, one or more ultrasonic generators drive one or more ultrasonic transducers, or arrays of transducers, coupled to a liquid to clean and/or process the delicate part. The liquid is preferably held within a tank; and the transducers mount on or within the tank to impart ultrasound into the liquid. In this context, the invention is particularly directed to one or more of the following aspects and advantages:

(1) By utilizing harmonics of certain clamped ultrasound transducers, the invention generates, in one aspect, ultrasound within the liquid in a frequency range of between about 100 khz to 350 khz (i.e., "microsonic" frequencies). This has certain advantages over the prior art. In particular, unlike prior art low frequency ultrasound systems which operate at less than 100 khz, the invention eliminates or greatly reduces damaging cavitation implosions within the liquid. Further, the transducers operating in this frequency range provide relatively uniform microstreaming, such as provided by megasonics; but they are also relatively rugged and reliable, unlike megasonic transducer elements. In addition, and unlike megasonics, microsonic waves are not highly collimated, or "beam-like," within liquid; and therefore efficiently couple into the geometry of the ultrasonic tank. Preferably, the application of microsonic frequencies to liquid occurs simultaneously with a sweeping of the microsonic frequency within the transducer's harmonic bandwidth. That is, microsonic transducers (clamped harmonic transducers) are most practical when there is a sweep rate of the applied microsonic frequency. This combination reduces or eliminates (a) standing waves within the liquid, (b) other resonances, (c) high energy cavitation implosions, and (d) non-uniform sound fields, each of which is undesirable for cleaning or processing semiconductor wafers and delicate parts.

(2) The ultrasound transducers or arrays of the invention typically have a finite bandwidth associated with the range of frequencies about a resonant or harmonic frequency. When driven at frequencies within the bandwidth, the transducers generate acoustic energy that is coupled into the liquid. In one aspect, the invention drives the transducers such that the frequency of applied energy has a sweep rate within the bandwidth; and that sweep rate is also varied so that the sweep rate is substantially non-constant during operation. For example, the sweep rate can change linearly, randomly, or as some other function of time. In this manner, the invention reduces or eliminates resonances which are created by transducers operating with a single sweep rate, such as provided in the prior art.

(3) At least one ultrasound generator of the invention utilizes amplitude modulation (AM). However, unlike the prior art, this AM generator operates by selectively changing the AM frequency over time. In a preferred aspect of the invention, the AM frequency is swept through a range of frequencies which reduce or eliminate low frequency resonances within the liquid and the part being processed. Accordingly, the AM frequency is swept through a range of frequencies; and this range is typically defined as about 10–40% of the optimum AM frequency. The optimum AM frequency is usually between about 1 hz and 10 khz. Therefore, for example, if the optimum AM frequency is 1 khz, then the AM frequency is swept through a frequency range of between about 850 hz and 1150 hz. In addition, the rate at which these frequencies are varied is usually less than about 1/10th of the optimum AM frequency. In this example, therefore, the AM sweep rate is about 100 hz. These operations of sweeping the AM frequency through a range of frequencies and at a defined AM sweep rate reduce or eliminate unwanted resonances which might otherwise occur at the optimum AM frequency. In another aspect of the invention, for delicate parts with very low frequency resonances, the AM frequency is changed randomly or the AM sweep rate is swept at a function of time with a frequency about 1/10th of the AM sweep rate.

(4) The invention provides AM control by selecting a portion of the rectified power line frequency (e.g., 60 hz in the United States and 50 hz in Europe). In one aspect, this AM control is implemented by selecting a portion of the leading quarter sinusoid in a full wave amplitude modulation pattern that ends at the required amplitude in the zero to 90° and the 180° to 270° regions. Another AM control is implemented by selecting a portion of the leading quarter sinusoid in a half wave amplitude modulation pattern that ends at the required amplitude in the zero to 90° region.

(5) The invention can utilize several tanks, transducers and generators simultaneously to provide a wet bath of different chemistries for the delicate part. In one aspect, when two or more generators are operating at the same time, the invention synchronizes their operation to a common FM signal so that each generator can be adjusted, through AM, to control the process characteristics within the associated tank. In this manner, undesirable beating effects or cross-coupling between multiple tanks are reduced or eliminated. In a preferred aspect, a master generator provides a common FM signal to the other generators, each operating as a slave generator coupled to the master generator, and each slave generator provides AM selectively. In addition, because the transducers in the several tanks are sometimes swept through the frequencies of the transducer's bandwidth, the FM control maintains overall synchronization even though varying AM is applied to the several transducers. The multi-generator FM synchronization also applies to single tank ultrasonic systems. That is, the invention supports the synchronized operation of a plurality of generators that are connected to a single tank. In this case, each generator has an associated harmonic transducer array and is driven with a common FM signal and AM signal so that the frequencies within the tank are synchronized, in magnitude and phase, to reduce or eliminate unwanted resonances which might otherwise occur through beating effects between the multiple generators and transducers.

(6) In another aspect, the invention utilizes two or more transducers, in combination, to broaden the overall bandwidth of acoustical energy applied to the liquid around the primary frequency or one of the harmonics. For example, the invention of one aspect has two clamped transducers operating at their first, second third, or fourth harmonic frequency between about 100 khz and 350 khz. The center harmonic frequency of each is adjusted so as to be different from each other. However, their bandwidths are made to overlap such that an attached generator can drive the transducers, in combination, to deliver ultrasound to the liquid in a broader bandwidth. In a preferred aspect, two or more transducers, or transducer arrays, operate at unique harmonic frequencies and have finite bandwidths that overlap with each of the other transducers. If, for example, each transducer has a bandwidth of 4 khz, then two such transducers can approximately provide a 8 khz bandwidth, and three such transducers can approximately provide a 12 khz bandwidth, and so on.

(7) In one aspect, the invention provides a single tank system which selects a desired frequency, or range of frequencies, from a plurality of connected ultrasonic generators. Specifically, two or more generators, each operating or optimized to generate a range of frequencies, are connected to a mux; and the system selects the desired frequency range, and hence the right generator, according to the cavitation implosion energy that is desired within the tank chemistry.

(8) The invention has additional and sometimes greater advantages in systems and methods which combine one or more of the features in the above paragraphs (1) through (7). By way of example, one particularly useful system combines two or more microsonic transducers (i.e., paragraph 1) to create broadband microsonics (i.e., paragraph 6) within liquid. Such a system can further be controlled to provide a specific amplitude modulation (i.e., paragraph 4). Other particularly advantageous systems and methods of the invention are realized with the following combinations: (2) and (4); (1), (2) and (4); and (1) and (2) with frequency sweeping of the microsonic frequency.

The following patents, each incorporated herein by reference, provide useful background to the invention in the area of ultrasonic generators: U.S. Pat. Nos. 3,152,295; 3,293,456; 3,629,726; 3,638,087; 3,648,188; 3,651,352; 3,727,112; 3,842,340; 4,044,297; 4,054,848; 4,069,444; 4,081,706; 4,109,174; 4,141,608; 4,156,157; 4,175,242; 4,275,363; and 4,418,297. Further, U.S. Pat. Nos. 4,743,789 and 4,736,130 provide particularly useful background in connection with ultrasonic generators that are suitable for use with certain aspects of the invention, and are, accordingly incorporated herein by reference.

Clamped ultrasonic transducers suitable for use with the invention are known in the art. For example, the following patents, each incorporated herein by reference, provide useful background to the invention: U.S. Pat. Nos. 3,066,232; 3,094,314; 3,113,761; 3,187,207; 3,230,403; 3,778,758; 3,804,329 and RE 25,433.

Techniques for mounting or affixing transducers within the tank, and of arranging the transducer and/or tank geometry are, for example, described in U.S. Pat. Nos. 4,118,649; 4,527,901; 4,543,130; and 4,836,684. Each of these patents is also incorporated by reference.

Single chamber ultrasonic processing systems are described, for example, in U.S. Pat. Nos. 3,690,333; 4,409,999; 5,143,103; and 5,201,958. Such systems provide additional background to the invention and are, accordingly, incorporated herein by reference.

In one aspect, the invention provides a system for delivering broadband ultrasound to liquid. The system includes first and second ultrasonic transducers. The first transducer has a first frequency and a first ultrasound bandwidth, and the second transducer has a second frequency and a second ultrasound bandwidth. The first and second bandwidths are overlapping with each other and the first frequency is different from the second frequency. An ultrasound generator drives the transducers at frequencies within the bandwidths. Together, the first and second transducers and the generator produce ultrasound within the liquid and with a combined bandwidth that is greater than either of the first and second bandwidths.

In another aspect, the system of the invention includes a third ultrasonic transducer that has a third frequency and a third ultrasound bandwidth. The third bandwidth is overlapping with at least one of the other bandwidths, and the third frequency is different from the first and second frequencies. The generator in this aspect drives the third transducer within the third bandwidth so as to produce ultrasound within the liquid and with a combined bandwidth that is greater than any of the first, second and third bandwidths.

Preferably, each of the transducers are clamped so as to resist material strain and fatigue. In another aspect, each of the first and second frequencies are harmonic frequencies of the transducer's base resonant frequency. In one aspect, these harmonic frequencies are between about 100 khz and 350 khz.

In another aspect, the system includes at least one other synergistic ultrasonic transducer that has a synergistic frequency and a synergistic ultrasound bandwidth. As above, the synergistic bandwidth is overlapping with at least one of the other bandwidths, and the synergistic frequency is different from the first and second frequencies. The generator drives the synergistic transducer within the synergistic bandwidth so as to produce ultrasound within the liquid and with a combined bandwidth that is greater than any of the other bandwidths. In one aspect, this synergistic frequency is a harmonic frequency between about 100 khz and 350 khz.

In other aspects, the bandwidths of combined transducers overlap so that, in combination, the transducers produce ultrasonic energy at substantially all frequencies within the combined bandwidth. Preferably, the combined operation provides ultrasound with relatively equal power for any frequency in the combined bandwidth. Using the full width half maximum (FWHM) to define each bandwidth, the bandwidths preferably overlap such that the power at each frequency within the combined bandwidth is within a factor of two of ultrasonic energy produced at any other frequency within the combined bandwidth.

In another aspect, a system is provided for delivering ultrasound to liquid. The system has an ultrasonic transducer with a harmonic frequency between about 100 khz and 350 khz and within an ultrasound bandwidth. A clamp applies compression to the transducer. An ultrasound generator drives the transducer at a range of frequencies within the bandwidth so as to produce ultrasound within the liquid.

In still another aspect, the system can include at least one other ultrasonic transducer that has a second harmonic frequency within a second bandwidth. As above, the second frequency is between about 100 khz and 350 khz, and the second bandwidth is overlapping, in frequency, with the ultrasound bandwidth. The generator drives the transducers at frequencies within the bandwidths so as to produce ultrasound within the liquid and with a combined bandwidth that is greater than the bandwidth of a single transducer.

Another aspect of the invention provides a system for delivering ultrasound to liquid. In such a system, one or more ultrasonic transducers have an operating frequency within an ultrasound bandwidth. An ultrasound generator drives the transducers at frequencies within the bandwidth, and also changes the sweep rate of the frequency continuously so as to produce non-resonating ultrasound within the liquid.

Preferably, the generator of the invention changes the sweep rate frequency in one of several ways. In one aspect, for example, the sweep rate is varied as a function of time. In another aspect, the sweep rate is changed randomly. Typically, the sweep rate frequency is changed through a range of frequencies that are between about 10–50% of the optimum sweep rate frequency. The optimum sweep rate frequency is usually between about 1 hz and 1.2 khz; and, therefore, the range of frequencies through which the sweep rate is varied can change dramatically. By way of example, if the optimum sweep rate is 500 hz, then the range of sweep rate frequencies is between about 400 hz and 600 hz; and the invention operates by varying the sweep rate within this range linearly, randomly, or as a function of time, so as to optimize processing characteristics within the liquid.

The invention further provides a system for delivering ultrasound to liquid. This system includes one or more ultrasonic transducers, each having an operating frequency within an ultrasound bandwidth. An amplitude modulated ultrasound generator drives the transducers at frequencies within the bandwidth. A generator subsystem also changes the modulation frequency of the AM, continually, so as to produce ultrasound within the liquid to prevent low frequency resonances at the AM frequency.

Preferably, the subsystem sweeps the AM frequency at a sweep rate between about 1 hz and 100 hz. For extremely sensitive parts and/or tank chemistries, the invention can further sweep the AM sweep rate as a function of time so as to eliminate possible resonances which might be generated by the AM sweep rate frequency. This sweeping of the AM sweep rate occurs for a range of AM sweep frequencies generally defined by 10–40% of the optimum AM sweep rate. For example, if the optimum AM sweep rate is 150 hz, then one aspect of the invention changes the AM sweep rate through a range of about 130 hz to 170 hz.

In one aspect, the invention also provides amplitude control through the power lines. Specifically, amplitude modulation is achieved by selecting a portion of a leading quarter sinusoid, in a full wave amplitude modulation pattern, that ends at a selected amplitude in a region between zero and 90° and between 180° and 270° of the sinusoid. Alternatively, amplitude control is achieved by selecting a portion of a leading quarter sinusoid, in a half wave amplitude modulation pattern, that ends at a selected amplitude between zero and 90° of the sinusoid.

In still another aspect, a system of the invention can include two or more ultrasound generators that are synchronized in magnitude and phase so that there is substantially zero frequency difference between signals generated by the generators. Preferably, a timing signal is generated between the generators to synchronize the signals. In one aspect, a FM generator provides a master frequency modulated signal to each generator to synchronize the signals from the generators.

A generator of the invention can also be frequency modulated over a range of frequencies within the bandwidth of each transducer. In another aspect, the frequency modulation occurs over a range of frequencies within the bandwidth of each transducer, and the generator is amplitude modulated over a range of frequencies within the bandwidth of each transducer.

The systems of the invention generally include a chamber for holding the solution or liquid which is used to clean or process objects therein. The chamber can include, for example, material such as 316L stainless steel, 304 stainless steel, polytetrafluoroethylene, fluorinated ethylene propylene, polyvinylidine fluoride, perfluoroalkoxy, polypropylene, polyetheretherketone, tantalum, teflon coated stainless steel, titanium, hastalloy, and mixtures thereof.

It is preferable that the transducers of the system include an array of ultrasound transducer elements.

The invention also provides a method of delivering broadband ultrasound to liquid, including the steps of: driving a first ultrasound transducer with a generator at a first frequency and within a first ultrasound bandwidth, and driving a second ultrasound transducer with the generator at a second frequency within a second ultrasound bandwidth that overlaps at least part of the first bandwidth, such that the first and second transducers, in combination with the generator, produce ultrasound within the liquid and with a combined bandwidth that is greater than either of the first and second bandwidths.

In other aspects, the method includes the step of compressing at least one of the transducers, and/or the step of driving the first and second transducers at harmonic frequencies between about 100 khz and 350 khz.

Preferably, the method includes the step of arranging the bandwidths to overlap so that the transducers and generator produce ultrasonic energy, at each frequency, that is within a factor of two of ultrasonic energy produced by the transducers and generator at any other frequency within the combined bandwidth.

The application of broadband ultrasound has certain advantages. First, it increases the useful bandwidth of multiple transducer assemblies so that the advantages to sweeping ultrasound are enhanced. The broadband ultrasound also gives more ultrasonic intensity for a given power level because there are additional and different frequencies spaced further apart in the ultrasonic bath at any one time. Therefore, there is less sound energy cancellation because only frequencies of the same wavelength, the same amplitude and opposite phase cancel effectively.

In one aspect, the method of the invention includes the step of driving an ultrasonic transducer in a first bandwidth of harmonic frequencies centered about a microsonic frequency in the range of 100 khz and 350 khz. For protection, the transducer is preferably compressed to protect its integrity.

Another method of the invention provides the following steps: coupling one or more ultrasonic transducers to the liquid, driving, with a generator, the transducers to an operating frequency within an ultrasound bandwidth, the transducers and generator generating ultrasound within the liquid, changing the frequency within the bandwidth at a sweep rate, and continuously varying the sweep rate as a function of time so as to reduce low frequency resonances.

In other aspects, the sweep rate is varied according to one of the following steps: sweeping the sweep rate as a function of time; linearly sweeping the sweep rate as a function of time; and randomly sweeping the sweep rate. Usually, the optimum sweep frequency is between about 1 hz and 1.2 khz, and therefore, in other aspects, the methods of the invention change the sweep rate within a range of sweep frequencies centered about an optimum sweep frequency. Typically, this range is defined by about 10–50% of the optimum sweep frequency. For example, if the optimum sweep frequency is 800 hz, then the range of sweep frequencies is between about 720 hz and 880 hz. Further, and in another aspect, the rate at which the invention sweeps the sweep rate within this range is varied at less than about $\frac{1}{10}$th of the optimum frequency. Therefore, in this example, the invention changes the sweep rate at a rate that is less than about 80 hz.

Another method of the invention provides for the steps of (a) generating a drive signal for one or more ultrasonic transducers, each having an operating frequency within an ultrasound bandwidth, (b) amplitude modulating the drive signal at a modulation frequency, and (c) sweeping the modulation frequency, selectively, as to produce ultrasound within the liquid.

The invention is particularly useful as an ultrasonic system which couples acoustic energy into a liquid for purposes of cleaning parts, developing photosensitive polymers, and stripping material from surfaces. The invention can provide many sound frequencies to the liquid by sweeping the sound through the bandwidth of the transducers. This provides at least three advantages: the standing waves causing cavitation hot spots in the liquid are reduced or eliminated; part resonances within the liquid at ultrasonic frequencies are reduced or eliminated; and the ultrasonic activity in the liquid builds up to a higher intensity because there is less cancellation of sound waves.

In one aspect, the invention provides an ultrasonic bath with transducers having at least two different resonant frequencies. In one configuration, the resonant frequencies are made so that the bandwidths of the transducers overlap and so that the impedance versus frequency curve for the paralleled transducers exhibit maximum flatness in the resonant region. For example, when a 40 khz transducer with a 4.1 khz bandwidth is put in parallel—i.e., with overlapping bandwidths—with a 44 khz transducer with a 4.2 khz bandwidth, the resultant bandwidth of the multiple transducer assembly is about 8 khz. If transducers with three different frequencies are used, the bandwidth is approximately three times the bandwidth of a single transducer.

In another aspect, a clamped transducer array is provided with a resonant frequency of 40 khz and a bandwidth of 4 khz. The array has a second harmonic resonant frequency at 104 khz with a 4 khz harmonic bandwidth. Preferably, the bandwidth of this second harmonic frequency resonance is increased by the methods described above for the fundamental frequency of a clamped transducer array.

In one aspect, the invention provides a method and associated circuitry which constantly changes the sweep rate of an ultrasonic transducer within a range of values that is in an optimum process range. For example, one exemplary process can have an optimum sweep rate in the range 380 hz to 530 hz. In accord with one aspect of the invention, this sweep rate constantly changes within the 380 hz to 530 hz range so that the sweep rate does not set up resonances within the tank and set up a resonance at that rate.

The invention provides for several methods to change the sweep rate. One of the most effective methods is to generate a random change in sweep rate within the specified range. A simpler method is to sweep the sweep rate at some given function of time, e.g., linearly. One problem with sweeping the sweep rate is that the sweeping function of time has a specific frequency which may itself cause a resonance. Accordingly, one aspect of the invention is to sweep this time function; however, in practice, the time function has a specific frequency lower than the lowest resonant frequency of the semiconductor wafer or delicate part, so there is little need to eliminate that specific frequency.

Most prior art ultrasonic systems are amplitude modulated at a low frequency, typically 50 hz, 60 hz, 100 hz, or 120 hz. One ultrasonic generator, the proSONIK™ sold by Ney Ultrasonics Inc., and produced according to U.S. Pat. No. 4,736,130, permits the generation of a specific amplitude modulation pattern that is typically between 50 hz to 5 khz. However, the specific amplitude modulation frequency can itself be a cause of low frequency resonance in an ultrasonic bath if the selected amplitude modulation frequency is a resonant frequency of the delicate part.

Accordingly, one aspect of the invention solves the problem of delicate part resonance at the amplitude modulation frequency by randomly changing or sweeping the frequency of the amplitude modulation within a bandwidth of amplitude modulation frequencies that satisfy the process specifications. For cases where substantially all of the low frequencies must be eliminated, random changes of the modulation frequency are preferred. For cases where there are no resonances in a part below a specified frequency, the amplitude modulation frequency can be swept at a frequency below the specified frequency.

Random changing or sweeping of the amplitude modulation frequency inhibits low frequency resonances because there is little repetitive energy at a frequency within the resonant range of the delicate part or semiconductor wafer. Accordingly, a resonant condition does not build up, in accord with the invention, providing obvious advantages.

The invention also provides relatively inexpensive amplitude control as compared to the prior art. One aspect of the invention provides amplitude control with a full wave or half wave amplitude modulated ultrasonic signal. For full wave, a section of the 0° to 90° and the 180° to 270° quarter sinusoid is chosen which ends at the required (desired) amplitude. For example, at the zero crossover of the half sinusoid (0° and 180°), a monostable multivibrator is triggered. It is set to time out before 90° duration, and specifically at the required amplitude value. This timed monostable multivibrator pulse is used to select that section of the quarter sinusoid that never exceeds the required amplitude.

In one aspect, the invention also provides an adjustable ultrasonic generator. One aspect of this generator is that the sweep rate frequency and the amplitude modulation pattern frequency are randomly changed or swept within the optimum range for a selected process. Another aspect is that the generator drives an expanded bandwidth clamped piezoelectric transducer array at a harmonic frequency from 100 khz to 350 khz.

Such a generator provides several improvements in the problematic areas affecting lower frequency ultrasonics and megasonics: uncontrolled cavitation implosion, unwanted resonances, unreliable transducers, and standing waves. Instead, the system of the invention provides uniform microstreaming that is critical to semiconductor wafer and other delicate part processing and cleaning.

In another aspect of the invention, an array of transducers is used to transmit sound into a liquid at its fundamental frequency, e.g., 40 khz, and at each harmonic frequency, e.g., 72 khz or 104 khz. The outputs of generators which have the transducer resonant frequencies and harmonic frequencies are connected through relays to the transducer array. One generator with the output frequency that most closely producers the optimum energy in each cavitation implosion for the current process chemistry is switched to the transducer array.

In yet another aspect, the invention reduces or eliminates low frequency beat resonances created by multiple generators by synchronizing the sweep rates (both in magnitude and in phase) so that there is zero frequency difference between the signals coming out of multiple generators. In one aspect, the synchronization of sweep rate magnitude and phase is accomplished by sending a timing signal from one generator to each of the other generators. In another aspect, a master FM signal is generated that is sent to each "slave" power module, which amplifies the master FM signal for delivery to the transducers. At times, the master and slave aspect of the invention also provides advantages in eliminating or reducing the beat frequency created by multiple generators driving a single tank.

However, when multiple generators are driving different tanks in the same system, this master and slave aspect may not be acceptable because the AM of the FM signal is usually different for different processes in the different tanks. Accordingly, and in another aspect, a master control is provided which solves this problem. The master control of the invention has a single FM function generator (sweeping frequency signal) and multiple AM function generators, one for each tank. Thus, every tank in the system receives the same magnitude and phase of sweep rate, but a different AM as set on the control for each generator.

The invention also provides other advantages as compared to the prior art's methods for frequency sweeping ultrasound within the transducer's bandwidth. Specifically, the invention provides a sweeping of the sweep rate, within the transducer's bandwidth, such that low frequency resonances are reduced or eliminated. Prior art frequency sweep systems had a fixed sweep frequency that is selectable, once, for a given application. One problem with such prior art systems is that the single low frequency can set up a resonance in a delicate part, for example, a read-write head for a hard disk drive.

The invention also provides advantages in that the sweep frequency of the sweep rate can be adjusted to conditions within the tank, or to the configuration of the tank or transducer, or even to a process chemistry.

The invention also has certain advantages over prior art single chamber ultrasound systems. Specifically, the methods of the invention, in certain aspects, use different frequency ultrasonics for each different chemistry so that the same optimum energy in each cavitation implosion is maintained in each process or cleaning chemistry. According to other aspects of the invention, this process is enhanced by selecting the proper ultrasonic generator frequency that is supplied at the fundamental or harmonic frequency of the transducers bonded to the single ultrasonic chamber.

These and other aspects and advantages of the invention are evident in the description which follows and in the accompanying drawings.

BRIEF DESCRIPTION OF THE DRAWINGS

A more complete understanding of the invention may be obtained by reference to the drawings, in which:

FIG. 3 shows a block diagram illustrating one embodiment of a system constructed according to the invention;

FIG. 8 shows a schematic illustration of an AM sweep subsystem constructed according to the invention; FIG. 8A shows a typical AM frequency generated by an AM generator; FIG. 8B graphically shows AM sweep frequency as a function of time for a representative sweep rate, in accord with the invention;

FIG. 11 A shows representative AM waveform patterns as controlled through the system of FIG. 11.

DETAILED DESCRIPTION OF ILLUSTRATED EMBODIMENTS

Figure 1:
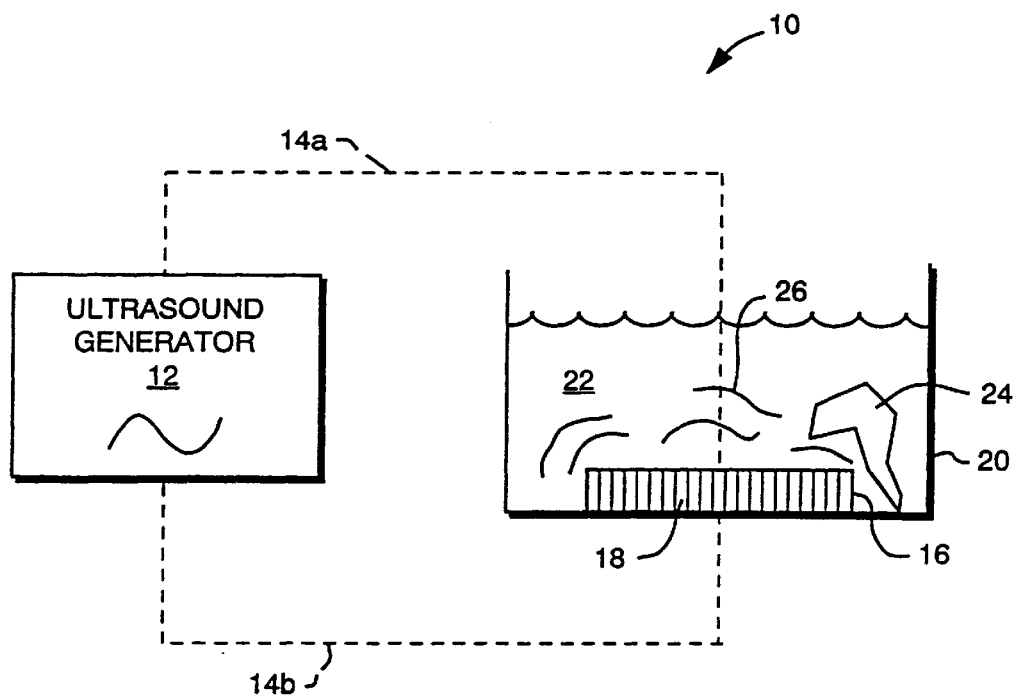
FIG. 1 shows a cut-away side view schematic of an ultrasound processing system constructed according to the invention.
Figure 1A:
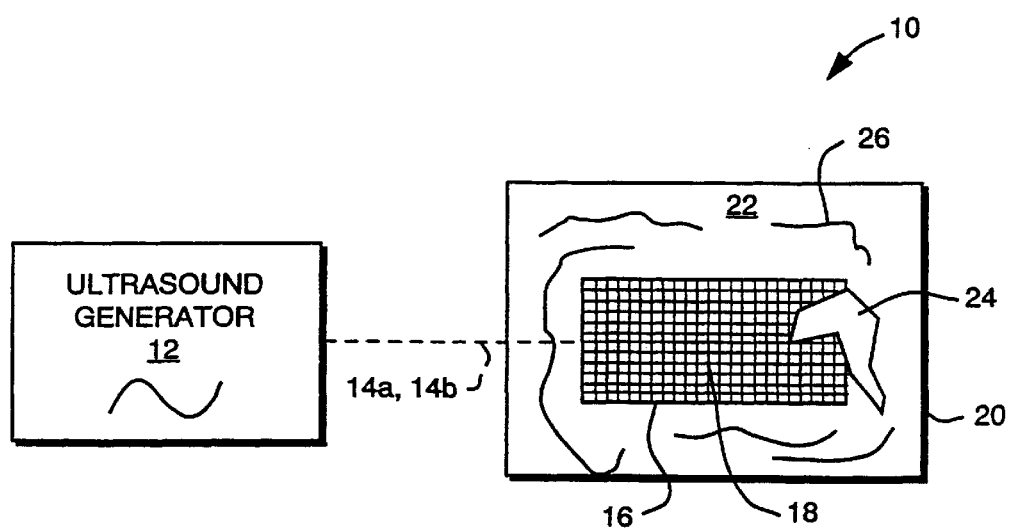
FIG. 1A shows a top view schematic of the system of FIG. 1.

FIGS. 1 and 1A show schematic side and top views, respectively, of an ultrasound processing system 10 constructed according to the invention. An ultrasonic generator 12 electrically connects, via electrical paths 14a, 14b, to an ultrasound transducer 16 to drive the transducer 16 at ultrasound frequencies above about 18 khz, and usually between 40 khz and 350 khz. Though not required, the transducer 16 is shown in FIG. 1 as an array of transducer elements 18. Typically, such elements 18 are made from ceramic, piezoelectric, or magnetostrictive materials which expand and contract with applied voltages or current to create ultrasound. The transducer 16 is mounted to the bottom, to the sides, or within the ultrasound treatment tank 20 through conventional methods, such as known to those skilled in the art and as described above. A liquid 22 fills the tank to a level sufficient to cover the delicate part 24 to be processed and/or cleaned. In operation, the generator 12 drives the transducer 16 to create acoustic energy 26 that couples into the liquid 22.

Although the transducer 16 is shown mounted to the bottom of the tank 20, those skilled in the art will appreciate that other mounting configurations are possible and envisioned. The transducer elements 18 are of conventional design, and are preferably "clamped" so as to compress the piezoelectric transducer material.

Figure 2:
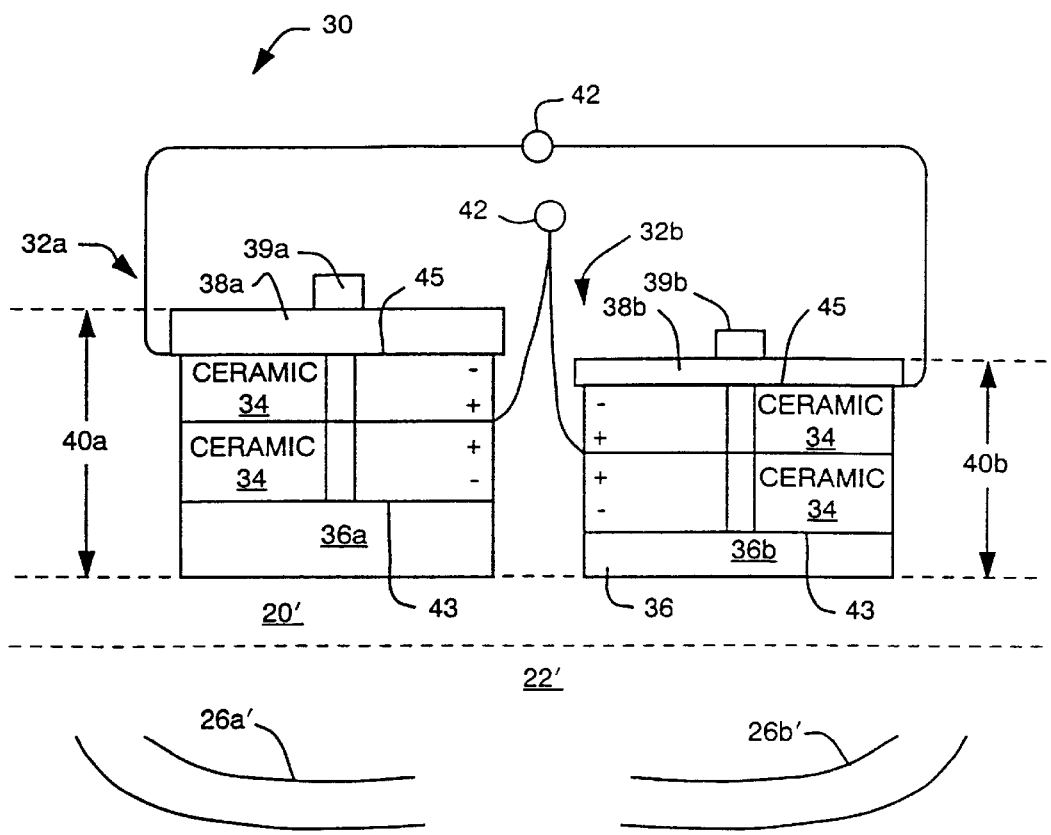
FIG. 2 shows a schematic illustration of a multi-transducer system constructed according to the invention and used to generate broadband ultrasound in a combined bandwidth.

FIG. 2 illustrates a two transducer system 30. Transducer 32a, 32b are similar to one of the elements 18, FIG. 1. Transducer 32a includes two ceramic sandwiched elements 34, a steel back plate 38a, and a front drive plate 36a that is mounted to the tank 20'. Transducer 32b includes two ceramic sandwiched elements 34, a steel back plate 38b, and a front drive plate 36b that is mounted to the tank 20'. Bolts 39a, 39b pass through the plates 38a, 38b and screw into the drive plates 36a, 36b, respectively, to compresses the ceramics 34. The transducers 32 are illustratively shown mounted to a tank surface 20'.

The transducers 32a, 32b are driven by a common generator such as generator 12 of FIG. 1. Alternatively, multiple generators can be used. The ceramics 34 are oriented with positive "+" orientations together or minus "−" orientations together to obtain cooperative expansion and contraction within each transducer 32. Lead-outs 42 illustrate the electrical connections which connect between the generator and the transducers 32 so as to apply a differential voltage there-across. The bolts 39a, 39b provide a conduction path between the bottoms 43 and tops 45 of the transducers 32 to connect the similar electrodes (here shown as of the elements 34.

The thicknesses 40a, 40b of transducers 32a, 32b, respectively, determine the transducer's fundamental resonant frequency. For purposes of illustration, transducer 32a has a fundamental frequency of 40 khz, and transducer 32b has a fundamental frequency of 44 khz. Transducers 32a, 32b each have a finite ultrasound bandwidth which can be adjusted, slightly, by those skilled in the art. Typically, however, the bandwidths are about 4 khz. By choosing the correct fundamental frequencies, therefore, an overlap between the bandwidths of the two transducers 32a, 32b can occur, thereby adding additional range within which to apply ultrasound 26a', 26b' to liquid 22'.

Figure 2A:
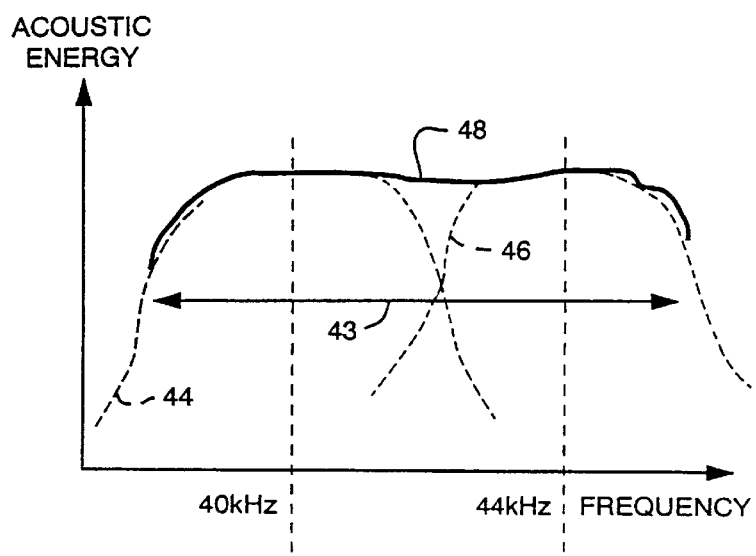
FIG. 2A graphically illustrates the acoustic disturbances produced by the two transducers of FIG. 2.

The acoustic energy 26' applied to the liquid 22' by the combination of transducers 32a, 32b is illustrated graphically in FIG. 2A. In FIG. 2A, the "x" axis represents frequency, and the "y" axis represents acoustical power. The outline 44 represents the bandwidth of transducer 32a, and outline 46 represents the bandwidth of transducer 32b. Together, they produce a combined bandwidth 43 which produces a relatively flat acoustical energy profile to the liquid 22', such as illustrated by profile 48. The flatness of the bandwidth 43 representing the acoustical profile 48 of the two transducers 32a, 32b is preferably within a factor of two of any other acoustical strength within the combined bandwidth 43. That is, if the FWHM defines the bandwidth 43; the non-uniformity in the profile 48 across the bandwidth 43 is typically better than this amount. In certain cases, the profile 48 between the two bandwidths 44 and 46 is substantially flat, such as illustrated in FIG. 2A.

The generator connected to lead-outs 42 drives the transducers 32a, 32b at frequencies within the bandwidth 43 to obtain broadband acoustical disturbances within the liquid 22'. As described herein, the manner in which these frequencies are varied to obtain the overall disturbance is important. Most preferably, the generator sweeps the frequencies through the overall bandwidth, and at the same time sweeps the rate at which those frequencies are changed. That is, one preferred generator of the invention has a "sweep rate" that sweeps through the frequencies within the bandwidth 43; and that sweep rate is itself varied as a function of time. In alternative embodiments of the invention, the sweep rate is varied linearly, randomly, and as some other function of time to optimize the process conditions within the tank 20'.

With further reference to FIGS. 1 and 1A, each of the elements 18 can have a representative bandwidth such as illustrated in FIG. 2A. Accordingly, an even larger bandwidth 43 can be created with three or more transducers such as illustrated by transducers 32a, 32b. In particular, any number of combined transducers can be used. Preferably, the bandwidths of all the combined transducers overlap to provide an integrated bandwidth such as profile 48 of FIG. 2A. As such, each transducer making up the combined bandwidth should have a unique resonant frequency.

Those skilled in the art understand that each of the transducers 18 and 32a, 32b, FIGS. 1 and 2A, respectively, have harmonic frequencies which occur at higher mechanical resonances of the primary resonant frequency. It is one preferred embodiment of the invention that such transducers operate at one of these harmonics, i.e., typically the first, second, third or fourth harmonic, so as to function in the frequency range of 100 khz to 350 khz. This frequency range provides a more favorable environment for acoustic processes within the tanks 20, 20' as compared to low frequency disturbances less than 100 khz. For example, ultrasound frequencies around the 40 khz frequency can easily cause cavitation damage in the part 24. Further, such frequencies tend to create standing waves and other hot spots of spatial cavitation within the liquid.

Figure 2B:
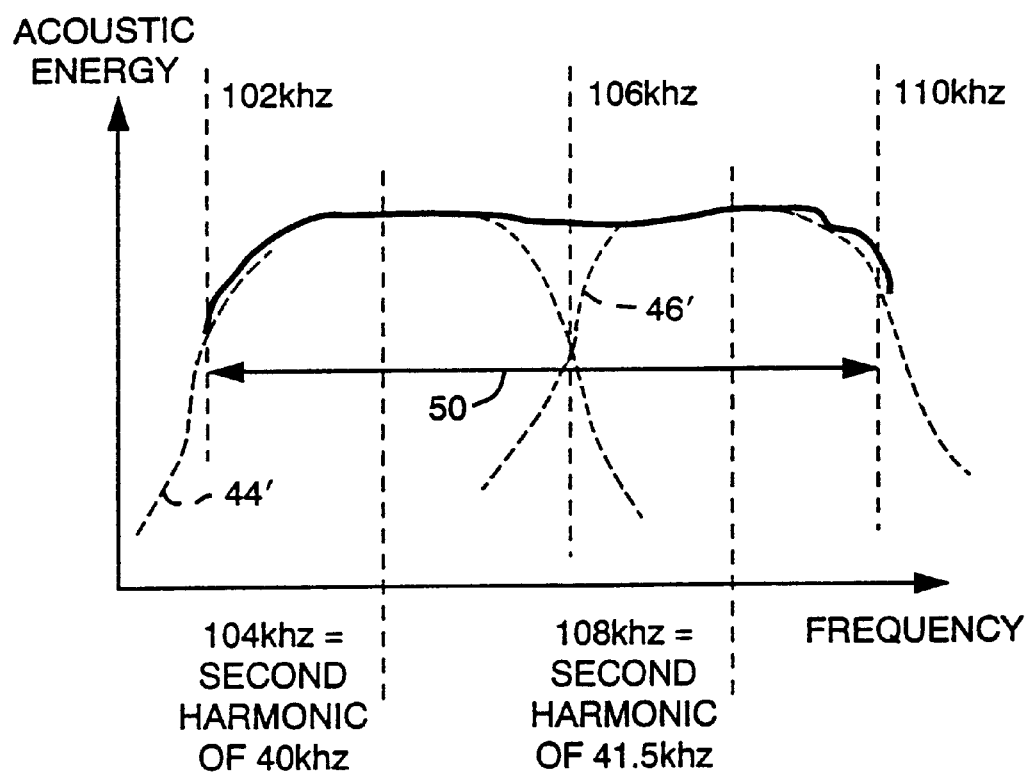
FIG. 2B graphically illustrates the broadband acoustic disturbances produced by harmonics of a multi-transducer system constructed according to the invention.

Accordingly, the benefits of applying a broadband acoustic disturbance to the liquid also apply to the 100–350 khz microsonic frequencies. Similar to FIG. 2A, FIG. 2B illustrates a combined bandwidth 50 of harmonic frequencies in the range 100–350 khz. Specifically, FIG. 2B shows the combined bandwidth 50 that is formed by the bandwidth 44' around the second harmonic of the 40 Khz frequency, and the bandwidth 46' around the second harmonic of the 41.5 khz frequency.

FIG. 3 shows in block diagram embodiment of a system 110 constructed according to the present invention. The system 110 includes a signal section 112 which drives a power module 121. The power module 121 powers the harmonic transducer array 122. The transducer array 122 are coupled to a liquid 123 by one of several conventional means so as to generate acoustic energy within the liquid 123. By way of example, the array 122 is similar to the array 16 of FIG. 1; and the liquid 123 is similar to the liquid 22 of FIG. 1.

The signal section 112 includes a triangle wave oscillator 114 with a frequency typically below 150 hz. The purpose of the oscillator 114 is to provide a signal that sweeps the sweep rate of the ultrasound frequencies generated by the transducer arrays 122.

The oscillator 114 is fed into the input of the sweep rate VCO 115 (Voltage Controlled Oscillator). This causes the frequency of the output of VCO 115 to linearly sweep at the frequency of the oscillator 114. The optimum sweep rate frequency output of VCO 115 is typically from about 10 hz, for magnetostrictive elements, to about 1.2 khz, for piezoelectrics. Therefore, the optimum center sweep rate frequency can be anywhere within the range of about 10 hz to 1.2 khz, and that sweep rate is varied within a finite range of frequencies about the center sweep frequency. This finite range is typically set to about 10–50% of the center sweep rate frequency. For example, the center sweep rate frequency for one process might be 455 hz, so the VCO 115 output is set, for example, to sweep from 380 hz to 530 hz. If, additionally, the oscillator 114 is set to 37 hz, then the output of VCO 115 changes frequency, linearly, from 380 hz to 530 hz, and back to 380 hz at thirty seven times per second.

The output of VCO 115 feeds the VCO input of the 2× center frequency VCO 116. The VCO 116 operates as follows. If, for example, the center frequency of VCO 116 is set to 208 khz and the bandwidth is set to 8 khz, the center frequency linearly changes from 204 khz to 212 khz and back to 204 khz in a time of 1.9 milliseconds (i.e., 1/530 hz) to 2.63 milliseconds (i.e., 1/380 hz). The specific time is determined by the voltage output of the oscillator 114 at the time of measurement. Since the voltage output of oscillator 114 is constantly changing, the time it takes to linearly sweep the center frequency from 204 khz to 212 khz and back to 204 khz is also constantly changing. In this example, the time changes linearly from 1.9 ms to 2.63 ms and back to 1.9 ms at thirty seven times per second.

The oscillator 114, VCO 115 and VCO 116 operate, in combination, to eliminate the repetition of a single sweep rate frequency in the range of 10 hz to 1.2 khz. For example, the highest single frequency that exists in the stated example system is 37 hz. If an unusual application or process were found whereby a very low frequency resonance around 37 hz exists, then the oscillator 114 would be replaced by a random voltage generator to reduce the liklihood of exciting any modes within the part.

The VCO 116 drives a divide-by-two D flip-flop 117. The purpose of the D flip-flop 117 is to eliminate asymmetries in the waveform from the VCO 116. The output of the D flip-flop 117 is thus a square wave that has the desired frequency which changes at a sweep rate that is itself sweeping. In the stated example, the output square wave from D flip-flop 117 linearly changes from 102 khz to 106 khz and back to 102 khz at different times in the range of 1.9 ms to 2.63 ms. This sweeping of the sweep rate is sometimes referred to herein as "double sweep" or "double sweeping."

The AC line zero-crossover detection circuit 118 produces a signal with a rise time or narrow pulse at or near the time that the AC line voltage is at zero or at a low voltage, i.e., at or near zero degrees. This signal triggers the adjustable monstable multivibrator 119. The timed pulse out of monostable multivibrator 119 is set to a value between zero degrees and ninety degrees, which corresponds to a time from zero to 4.17 ms for a 60 hz line frequency.

If the maximum amplitude were desired, for example, the monostable multivibrator 119 is set to a time of 4.17 ms for a 60 hz line frequency. For an amplitude that is 50% of maximum, the monostable multivibrator 119 is set to 1.389 ms for a 60 hz line frequency. In general, the monostable multivibrator 119 time is set to the arcsin of the amplitude percent times the period of the line frequency divided by 360 degrees.

The double sweeping square wave output of the D flip-flop 117 and the timed pulse output of the monostable multivibrator 119 feed into the synchronization logic 120. The synchronization logic 120 performs three primary functions. First, it only allows the double sweeping square wave to pass to the output of the synchronization logic 120 during the time defined by the pulse from the monostable multivibrator 119. Second, the synchronization logic 120 always allows a double sweeping square wave which starts to be completed, even if the monostable multivibrator 119 times out in the middle of a double sweeping square wave. And lastly, the synchronization logic 120 always starts a double sweeping square wave at the beginning of the ultrasonic frequency, i.e., at zero degrees.

The output of synchronization logic 120 is a double sweeping square wave that exists only during the time defined by the monostable multivibrator 119 or for a fraction of a cycle past the end of the monostable multivibrator 119 time period. The synchronization logic 120 output feeds a power module 121 which amplifies the pulsed double sweeping square wave to an appropriate power level to drive the harmonic transducers 122. The transducers 122 are typically bonded to a tank and deliver sound waves into the liquid within the tank. These sound waves duplicate the pulsed double sweeping characteristics of the output of the signal section 112.

Figure 4:
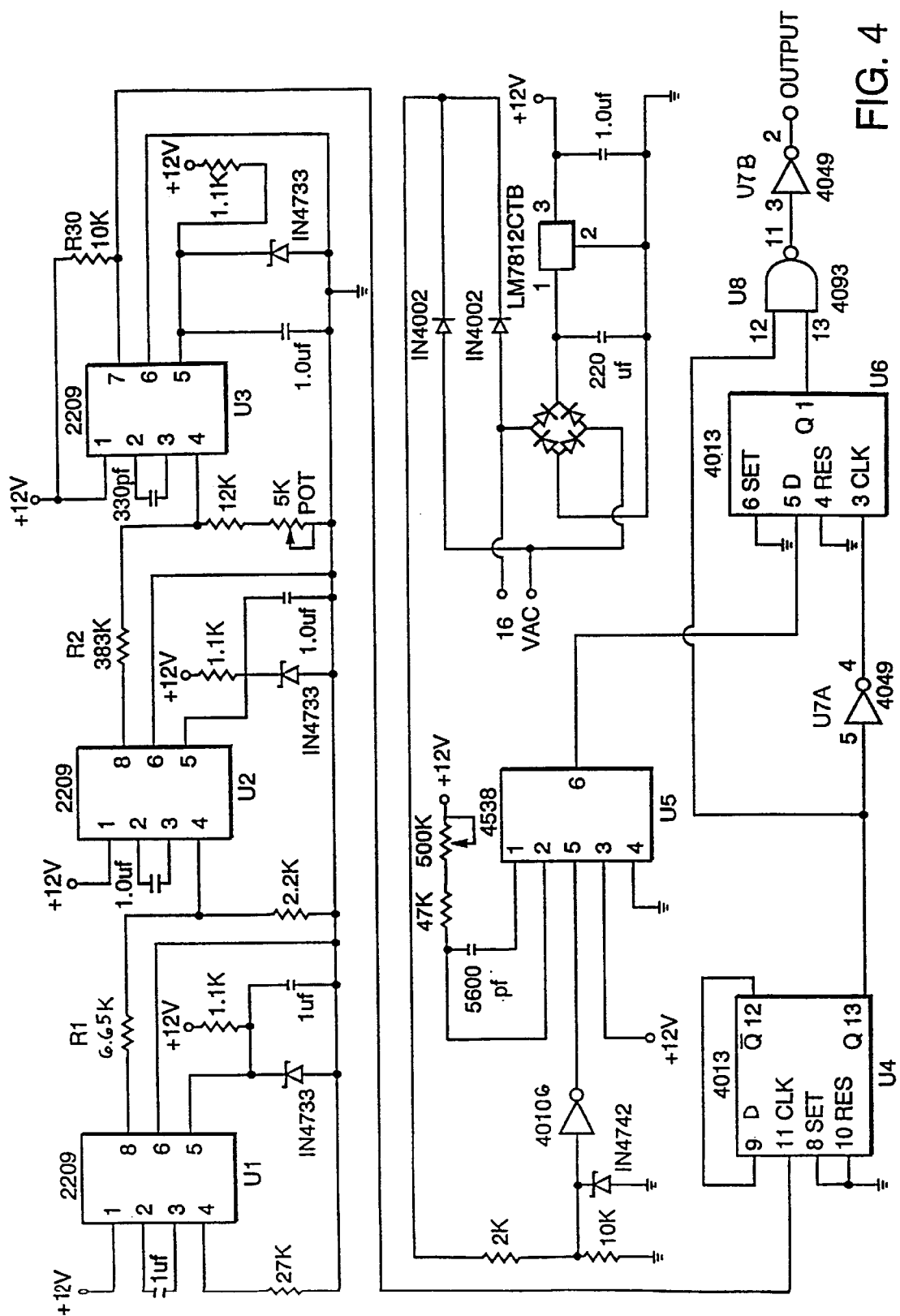
FIG. 4 shows a schematic embodiment of the signal section of the system of FIG. 3.

FIG. 4 shows a schematic embodiment of the signal section 112 in FIG. 3. U1 is a XR-2209 precision oscillator with a triangle wave output at pin 8. The frequency of the XR-2209 is 1/(RC)=1/((27 k) (1 $\mu$f))=37 hz. This sets the frequency of the triangle wave oscillator 114, FIG. 3, to sweep the sweep rate at 37 hz. The other components associated with the XR-2209 are the standard configuration for single supply operation of this integrated circuit.

U2 is a XR-2209 precision oscillator with a triangle wave output at pin 8. The center frequency of U2 is 1/(RC)=1/((2.2 k) (1 $\mu$f))=455 hz. The actual output frequency is proportional to the current flowing out of pin4 of U2. At 455 hz, this current is 6 volts/2.2 k=2.73 ma. It is generally desirable, according to the invention, to sweep the 455 hz sweep rate through a total change of 150 hz, i.e., 75 hz either side of 455 hz. Since 75 hz/455 hz=16.5%, the current flowing out of pin 4 must change by 16.5% in each direction, that is, by (16.5%) (2.73 ma)=0.45 ma. The triangle wave from U1 causes this change. The triangle wave changes from 3 volts to 9 volts; therefore, there is 3 volts on either side of 6 volts at pin 4 of U2 to cause the 0.45 ma change. By making R1=3 volts/0.45 ma=6.67k$\Omega$, the sweep rate is changed 75 hz either side of 455 hz. The actual R1 used in FIG. 4 is 6.65 k$\Omega$, a commercially available value giving an actual change of 75.2 hz.

U3 is a XR-2209 precision oscillator with a center frequency of approximately 1/(RC)=1/((12 k+2.5 k) (330 pf))= 209 khz with the potentiometer set to its center position of 2.5 k$\Omega$. In the actual circuit, the potentiometer is adjusted to about 100$\Omega$ higher to give the desired 208 khz center frequency. Out of U3 pin4 flows 6 volts/(12 k$\Omega$+2.5k$\Omega$+100$\Omega$)=0.41 ma. To change the center frequency a total of 8 khz, the 0.41 ma is changed by 4 khz/208 khz=1.92%, or 7.88 $\mu$a. This means that R2=3 volts/7.88 $\mu$a=381 k$\Omega$. In FIG. 4, however, the commercial value of 383 k$\Omega$ was used.

U3 pin7 has a square wave output that is changing from 204 khz to 212 khz and back to 204 khz at a rate between 380 hz and 530 hz. The actual rate is constantly changing thirty seven times a second as determined by U1.

U4 is a D flip-flop in a standard divide by two configuration. It squares up any non 50% duty cycle from U3 and provides a frequency range of 102 khz to 106 khz from the 204 khz to 212 khz U3 signal.

The output of U4 feeds the synchronization logic which is described below and after the description of the generation of the amplitude control signal.

The two 11N4002 diodes in conjunction with the bridge rectifier form a full wave half sinusoid signal at the input to the 40106 Schmidt trigger inverter. This invertor triggers when the half sinusoid reaches about 7 volts, which on a half sinusoid with an amplitude of 16 times the square root of two is close enough to the zero crossover for a trigger point in a practical circuit. The output of the 40106 Schmidt trigger falls which triggers U5, the edge triggered 4538 monostable multivibrator wired in a trailing edge trigger/retriggerable configuration. The output of U5 goes high for a period determined by the setting on the 500 k$\Omega$ potentiometer. At the end of this period, the output of U5 goes low. The period is chosen by setting the 500 k$\Omega$ potentiometer to select that portion of the leading one-quarter sinusoid that ends at the required amplitude to give amplitude control. This timed positive pulse feeds into the synchronization logic along with the square wave output of U4.

The timed pulse U5 feeds the D input of U6, a 4013 D-type flip flop. The square wave from U4 is invented by U7*a* and feeds the clock input of U6. U6 only transfers the signal on the D input to the output Q at the rise of a pulse on the clock input, Pin3. Therefore, the Q output of U6 on Pin1 is high when the D input of U6 on Pin3 is high and the clock input of U6 on Pin3 transitions high. This change in the Q output of U6 is therefore synchronized with the change in the square wave from U4.

The synchronized high Q output of U6 feeds U8 Pin13, a 4093 Schmidt trigger NAND gate. The high level on Pin13 of U8 allows the square wave signal to pass from U8 Pin12 to the output of U8 at Pin11.

In a similar way, U8 synchronizes the falling output from U5 with the square wave from U4. Therefore, only complete square waves pass to U8 Pin11 and only during the time period as chosen by monostable multivibrator U5. The 4049 buffer driver U7*b* inverts the output at U8 Pin11 so it has the same phase as the square wave output from U4. This signal, U7*b* Pin2 is now the proper signal to be amplified to drive the transducers.

Figure 5A:
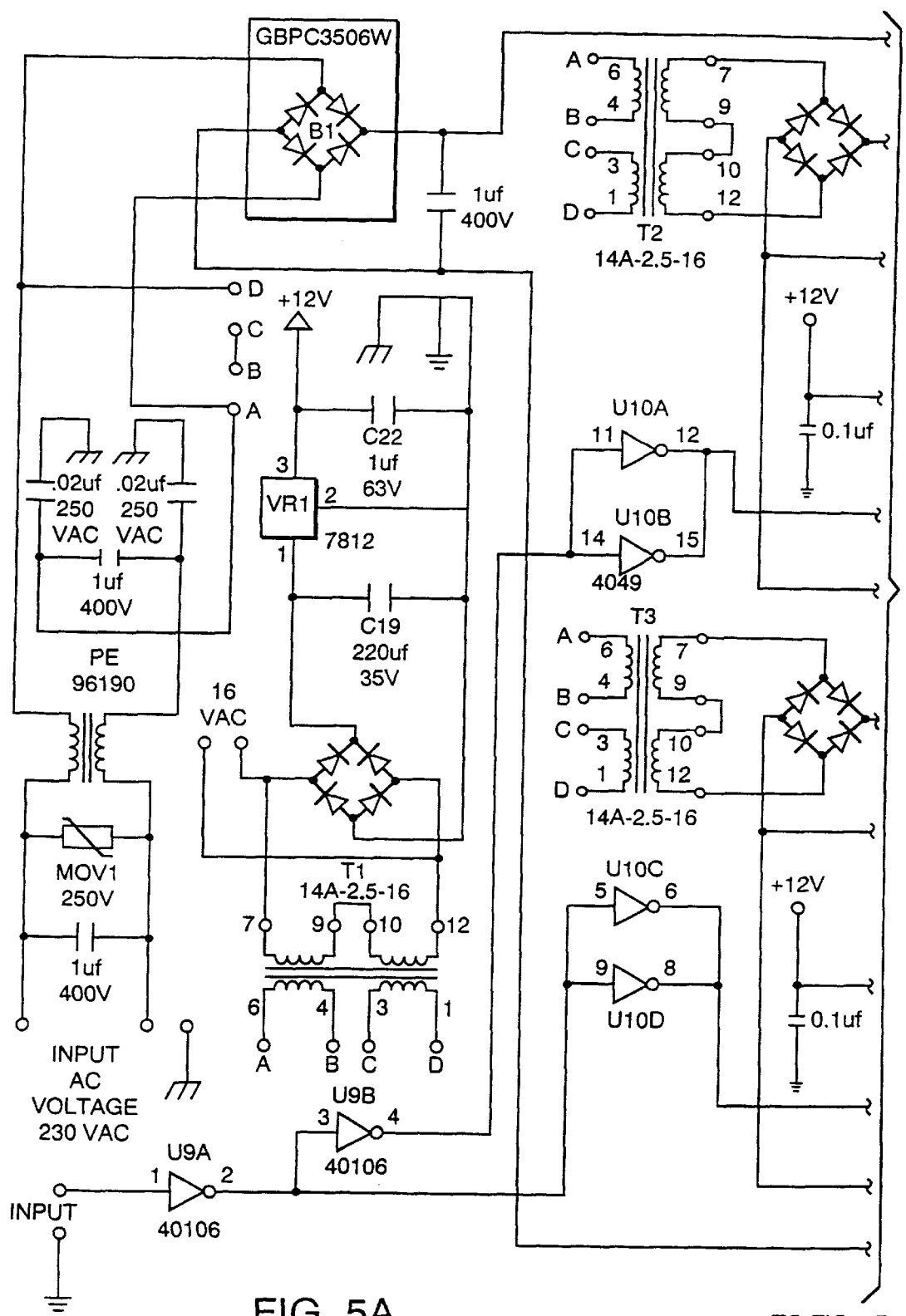
FIG. 5A and 5B show a schematic embodiment of the power module section of the system of FIG. 3.
Figure 5B:
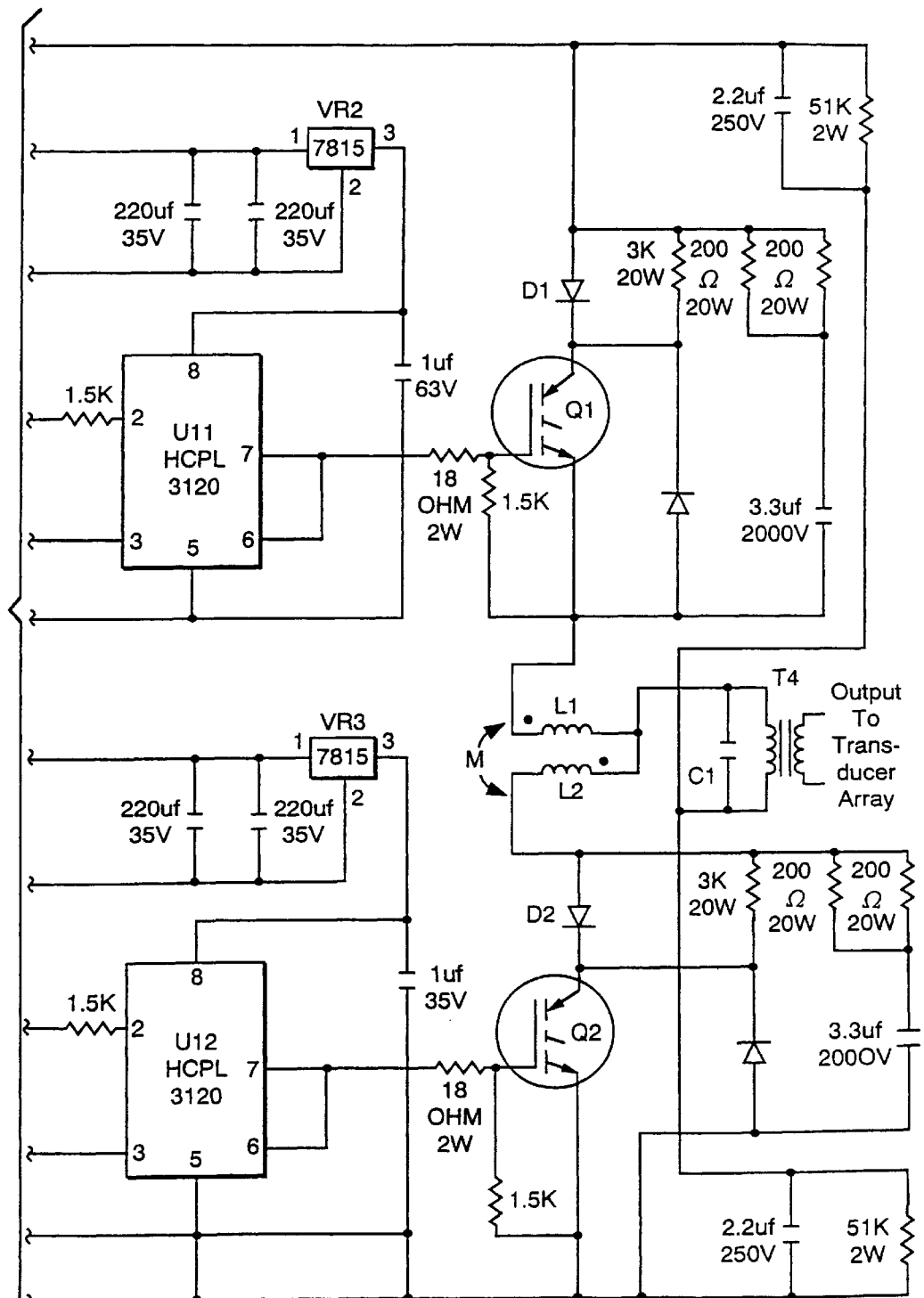

FIGS. 5A, 5B represent a circuit that increases the signal from U7*b* Pin 2 in FIG. 4 to a power level for driving the transducers 122, FIG. 3. There are three isolated power supplies. The first one, including a T1, a bridge, C19, VR1 and C22, produces +12 VDC for the input logic. The second and third isolated power supplies produce +15 VDC at VR2 Pin3 and VR3 Pin3 for gate drive to the IGBT's (insulated gate bipolar transistors).

The signal input to FIGS. 5A, 5B has its edges sharpened by the 40106 Schmidt trigger U9*a*. The output of U9*a* feeds the 4049 buffer drivers U10c and U10d which drive optical isolator and IGBT driver U12, a Hewlett Packard HCPL3120. Also, the output of U9a is inverted by U9b and feeds buffer drivers U10a and U10b which drive U11, another HCPL3120.

This results in an isolated drive signal on the output of U11 and the same signal on the output of U12, only 180° out of phase. Therefore, U11 drives Q1 on while U12 drives Q2 off. In this condition, a power half sinusoid of current flows from the high voltage full wave DC at B1 through D1 and Q1 and L1 into C1. Current cannot reverse because it is blocked by D1 and the off Q2. When the input signal changes state, U11 turns off Q1 and U12 turns on Q2, a half sinusoid of current flow out of C1 through L2 and D2 and Q2 back into C1 in the opposite polarity. This ends a complete cycle.

The power signal across C1 couples through the high frequency isolation transformer T4. The output of T4 is connected to the transducer or transducer array.

Figure 6A:
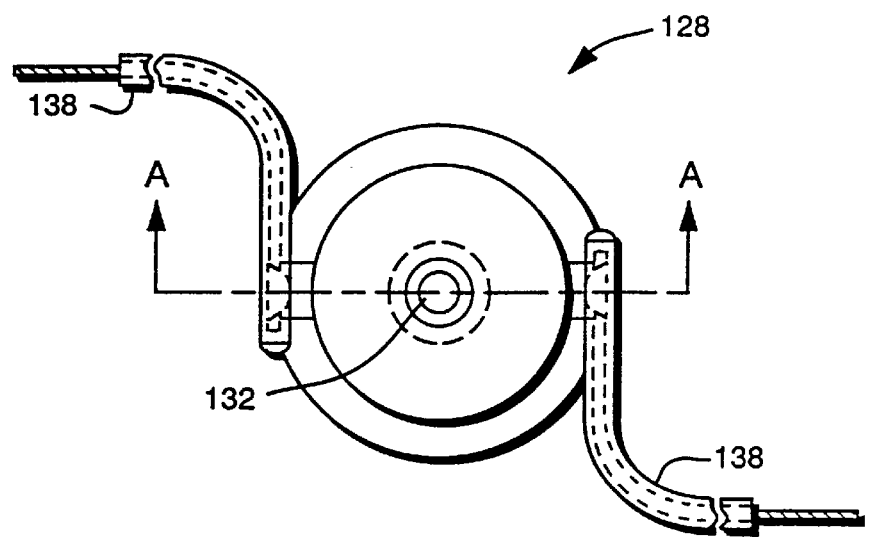
FIG. 6A is a top view of the harmonic transducer of FIG. 6.
Figure 6:
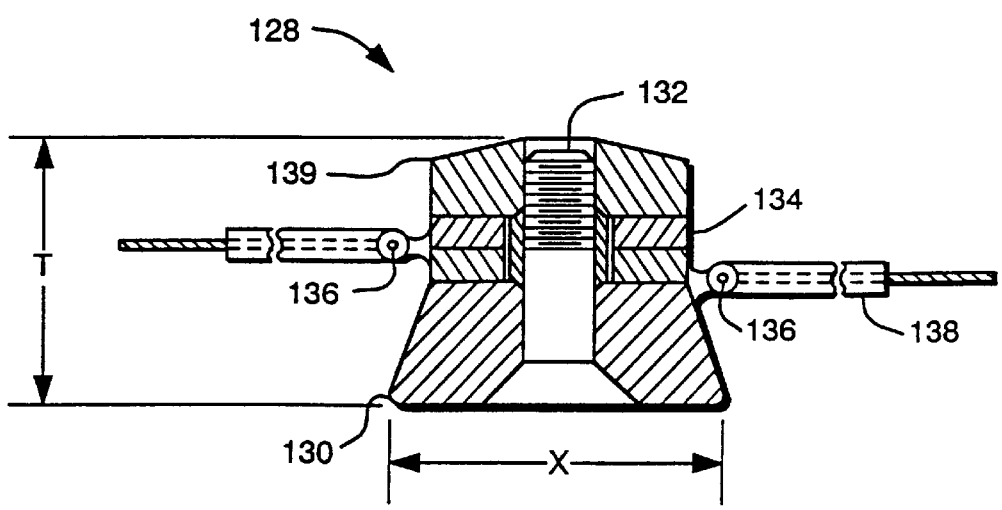
FIG. 6 is a cross-sectional side view of a harmonic transducer constructed according to the invention and driven by the power module of FIGS. 5A and 5B.

FIG. 6 shows a cross-sectional side view of one clamped microsonic transducer 128 constructed according to the invention; while FIG. 6A shows a top view of the microsonic transducer 128. The microsonic transducer 128 has a second harmonic resonant frequency of 104 khz with a 4 khz bandwidth (i.e., from 102 khz to 106 khz). The cone-shaped backplate 139 flattens the impedance verses frequency curve to broaden the frequency bandwidth of the microsonic transducer 128. Specifically, the backplate thickness along the "T" direction changes for translational positions along direction "X." Since the harmonic resonance of the microsonic transducer 128 changes as a function of backplate thickness, the conical plate 139 broadens and flattens the microsonic transducer's operational bandwidth.

The ceramic 134 of microsonic transducer 128 is driven through oscillatory voltages transmitted across the electrodes 136. The electrodes 136 connect to an ultrasonic generator (not shown), such as described above, by insulated electrical connections 138. The ceramic 134 is held under compression through operation of the bolt 132. Specifically, the bolt 132 provides 5,000 pounds of compressive force on the piezoelectric ceramic 134.

Figure 7:
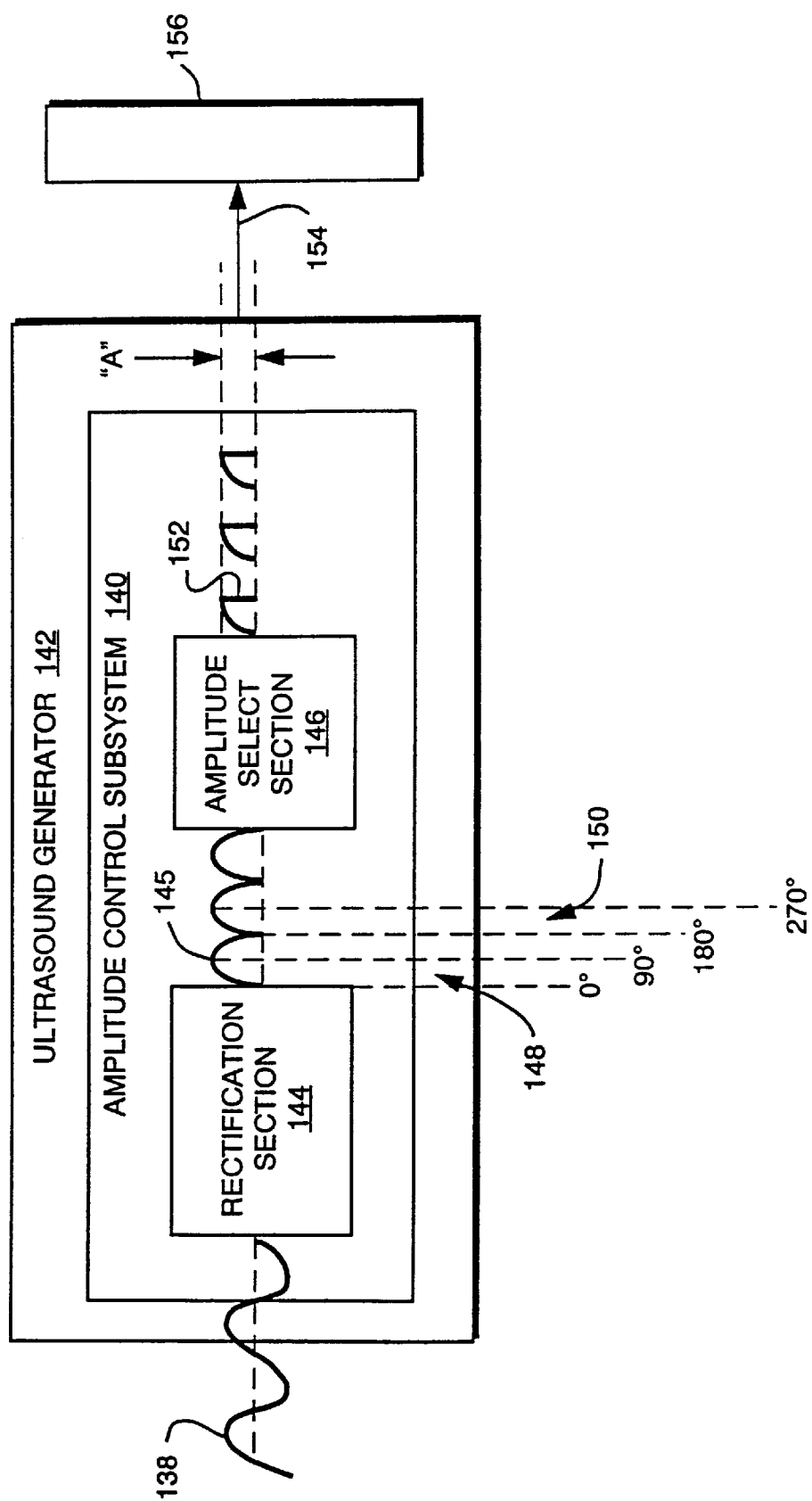
FIG. 7 is a schematic illustration of an amplitude control subsystem constructed according to the invention.
Figure 7A:
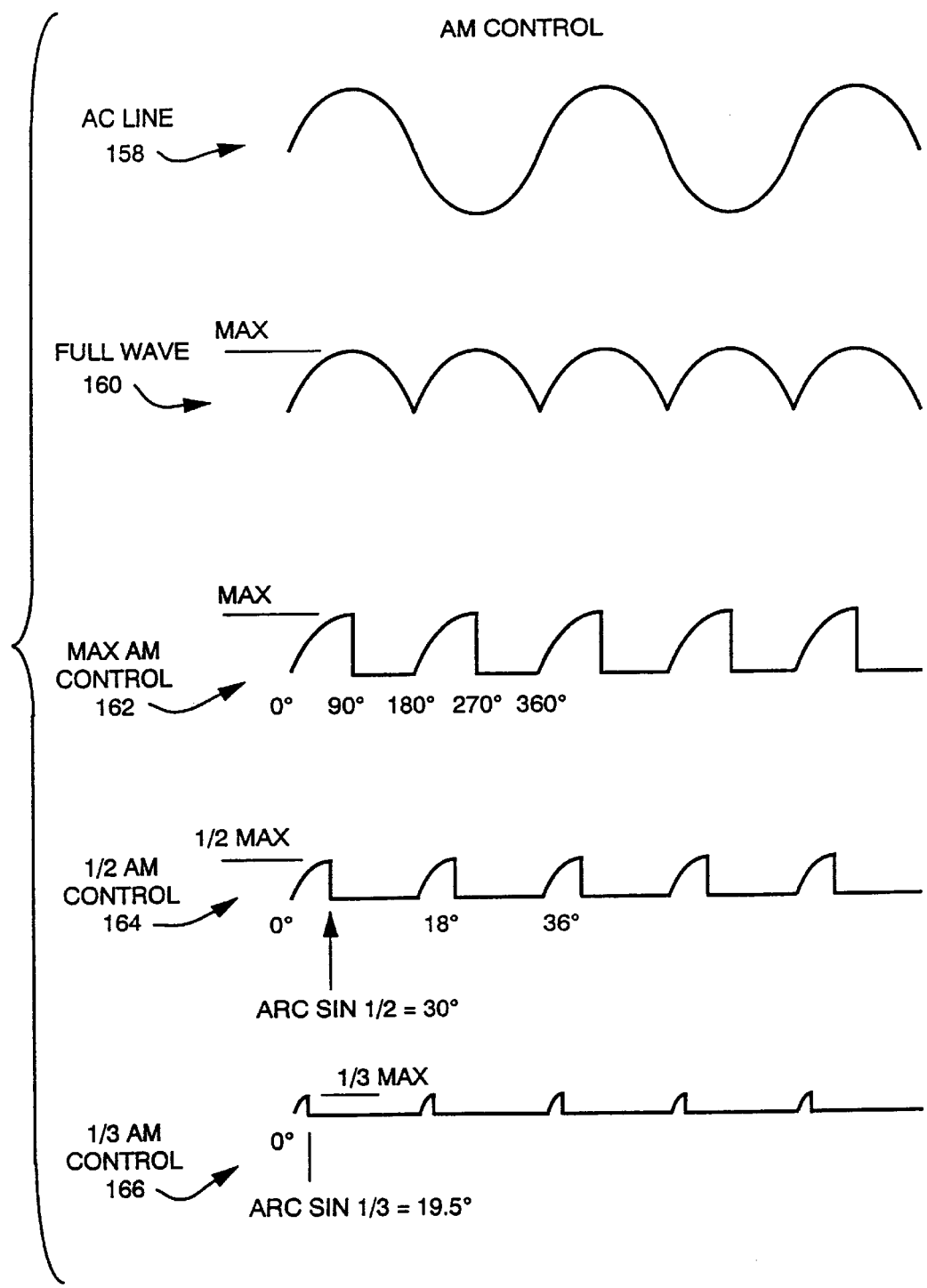
FIG. 7A shows illustrative amplitude control signals generated by an amplitude control subsystem such as in FIG. 7.

Amplitude control according to one embodiment of the invention is illustrated in FIGS. 7 and 7A. Specifically, FIG. 7 shows an amplitude control subsystem 140 that provides amplitude control by selecting a portion of the rectified line voltage 145 which drives the ultrasonic generator amplitude select section 146. The signal section 112, FIG. 3, and particularly the monostable multivibrator 119 and synchronization logic 120, provide similar functionality. In FIG. 7, the amplitude control subsystem 140 operates with the ultrasonic generator 142 and connects with the power line voltage 138. The rectification section 144 changes the ac to dc so as to provide the rectified signal 145.

The amplitude select section 146 selects a portion of the leading quarter sinusoid of rectified signal 145 that ends at the desired amplitude, here shown as amplitude "A," in a region 148 between zero and 90° and in a region 150 between 180° and 270° of the signal 145. In this manner, the amplitude modulation 152 is selectable in a controlled manner as applied to the signal 154 driving the transducers 156 from the generator 142, such as discussed in connection with FIGS. 3 and 4.

FIG. 7A shows illustrative selections of amplitude control in accord with the invention. The AC line 158 is first converted to a full wave signal 160 by the rectifier 144. Thereafter, the amplitude select section 146 acquires the signal amplitude selectively. For example, by selecting the maximum amplitude of 90° in the first quarter sinusoid, and 270° in the third quarter sinusoid, a maximum amplitude signal 162 is provided. Similarly, a one-half amplitude signal 164 is generated by choosing the 30° and 210° locations of the same sinusoids. By way of a further example, a one-third amplitude signal 166 is generated by choosing 19.5° and 199.5°, respectively, of the same sinusoids.

Those skilled in the art will appreciate that the rectification section 144 can also be a half-wave rectifier. As such, the signal 145 will only have a response every other one-half cycle. In this case, amplitude control is achieved by selecting a portion of the leading quarter sinusoid that ends at a selected amplitude between zero and 90° of the sinusoid.

The ultrasonic generator of the invention is preferably amplitude modulated. Through AM control, various process characteristics within the tank can be optimized. The AM control can be implemented such as described in FIGS. 3,4,7 and 7A, or through other prior art techniques such as disclosed in U.S. Pat. No. 4,736,130.

This "sweeping" of the AM frequency is accomplished in a manner that is similar to ultrasonic generators which sweep the frequency within the bandwidth of an ultrasonic transducer. By way of example, U.S. Pat. No. 4,736,130 describes one ultrasonic generator which provides variable selection of the AM frequency through sequential "power burst" generation and "quiet time" during a power train time. In accord with the invention, the AM frequency is changed to "sweep" the frequency in a pattern so as to provide an AM sweep rate pattern.

FIG. 8 illustrates an AM sweep subsystem 170 constructed according to the invention. The AM sweep subsystem 170 operates as part of, or in conjunction with, the ultrasonic generator 172. The AM generator 174 provides an AM signal 175 with a selectable frequency. The increment/decrement section 176 commands the AM generator 174 over command line 177 to change its frequency over a preselected time period so as to "sweep" the AM frequency in the output signal 178 which drives the transducers 180.

U.S. Pat. No. 4,736,130 describes one AM generator 56, FIG. 1, that is suitable for use as the generator 174 of FIG. 8. By way of example, FIG. 8A illustrates one selectable AM frequency signal 182 formed through successive 500μs power bursts and 300μs quiet times to generate a 1.25 khz signal (e.g., 1/(300 μs+500 μs)=1.25 khz). If, for example, the AM frequency is swept at 500 hz about a center frequency of 1.25 khz, such as shown in FIG. 8, then the frequency is commanded to vary between 1.25 khz+250 hz and 1.25 khz−250 hz, such as illustrated in FIG. 8B. FIG. 8B illustrates a graph of AM frequency versus time for this example.

Figure 9:
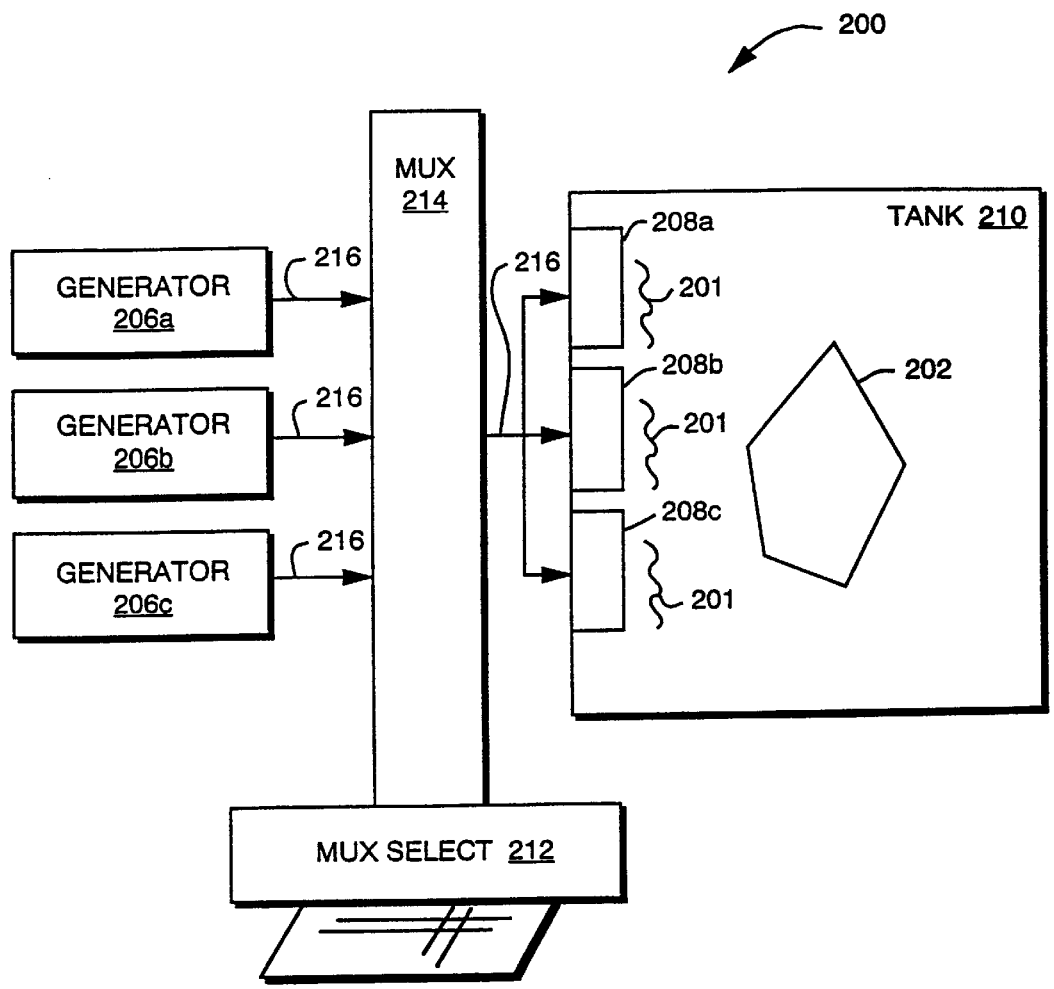
FIG. 9 illustrates a multi-generator, multi-frequency, single tank ultrasound system constructed according to the invention.

FIG. 9 schematically illustrates a multi-generator, single tank system 200 constructed according to the invention. In many instances, it is desirable to select an ultrasound frequency 201 that most closely achieves the cavitation implosion energy which cleans, but does not damage, the delicate part 202. In a single tank system such as in FIG. 9, the chemistries within the tank 210 are changed, from time to time, so that the desired or optimum ultrasound frequency changes. The transducers and generators of the prior art do not operate or function at all frequencies, so system 200 has multiple generators 206 and transducers 208 that provide different frequencies. By way of example, generator 206a can provide a 40 khz primary resonant frequency; while generator 206b can provide the first harmonic 72 khz frequency. Generator 206c can provide, for example, 104 khz microsonic operation. In the illustrated example, therefore, the generators 206a, 206b, 206c operate, respectively, at 40 khz, 72 khz, and 104 khz. Each transducer 208 responds at each of these frequencies so that, in tandem, the transducers generate ultrasound 201 at the same frequency to fill the tank 210 with the proper frequency for the particular chemistry.

In addition, each of the generators 206a–206c can and do preferably sweep the frequencies about the transducers' bandwidth centered about the frequencies 40 khz, 72 khz, and 104 khz, respectively; and they further sweep the sweep rate within these bandwidths to reduce or eliminate resonances which might occur at the optimum sweep rate.

When the tank 210 is filled with a new chemistry, the operator selects the optimum frequency through the mux select section 212. The mux select section connects to the analog multiplexer ("mux") 214 which connects to each generator 206. Specifically, each generator 206 couples through the mux 214 in a switching network that permits only one active signal line 216 to the transducers 208. For example, if the operator at mux select section 212 chooses microsonic operation to optimize the particular chemistry in the tank 210, generator 206c is connected through the mux 214 and drives each transducer 208a–208c to generate microsonic ultrasound 201 which fills the tank 210. If, however, generator 206a is selected, then each of the transducers 208 are driven with 40 khz ultrasound.

Figure 9A:
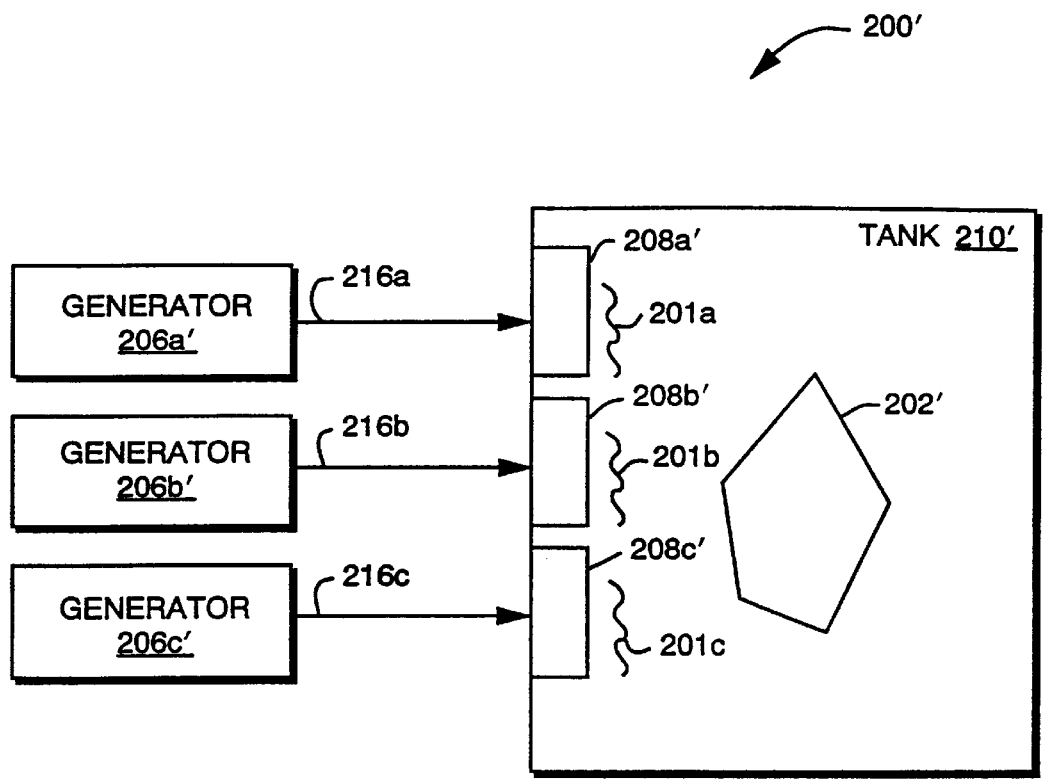
FIG. 9A illustrates another multi-generator, single tank system constructed according to the invention.

FIG. 9A illustrates another single tank, multi-generator system 200' constructed according to the invention. Specifically, like in FIG. 9, each of the generators 206' provides a different frequency. However, each generator 206' connects to drive unique transducer arrays 208' within the tank 210'. In this manner, for example, generator 206a' is selected to generate 40 khz ultrasound 201a in the tank 210'; generator 206b' is selected to generate 72 khz ultrasound 201b in the tank 210'; and generator 206c is selected to generate 104 khz microsonics 201c in the tank 210'. These generator/transducer pairs 206a'/208a', 206b'/208b' and 206c'/208c' do not generally operate at the same time; but rather are selected according to the process chemistries and part 202' in the tank 210'.

Those skilled in the art should appreciate that each of the generators 206 can be replaced by multiple generators operating at the same or similar frequency. This is sometimes needed to provide additional power to the tank 210 at the desired frequency. Those skilled in the art should also appreciate that the mux 214 can be designed in several known methods, and that techniques to do so abound in the art.

Figure 10:
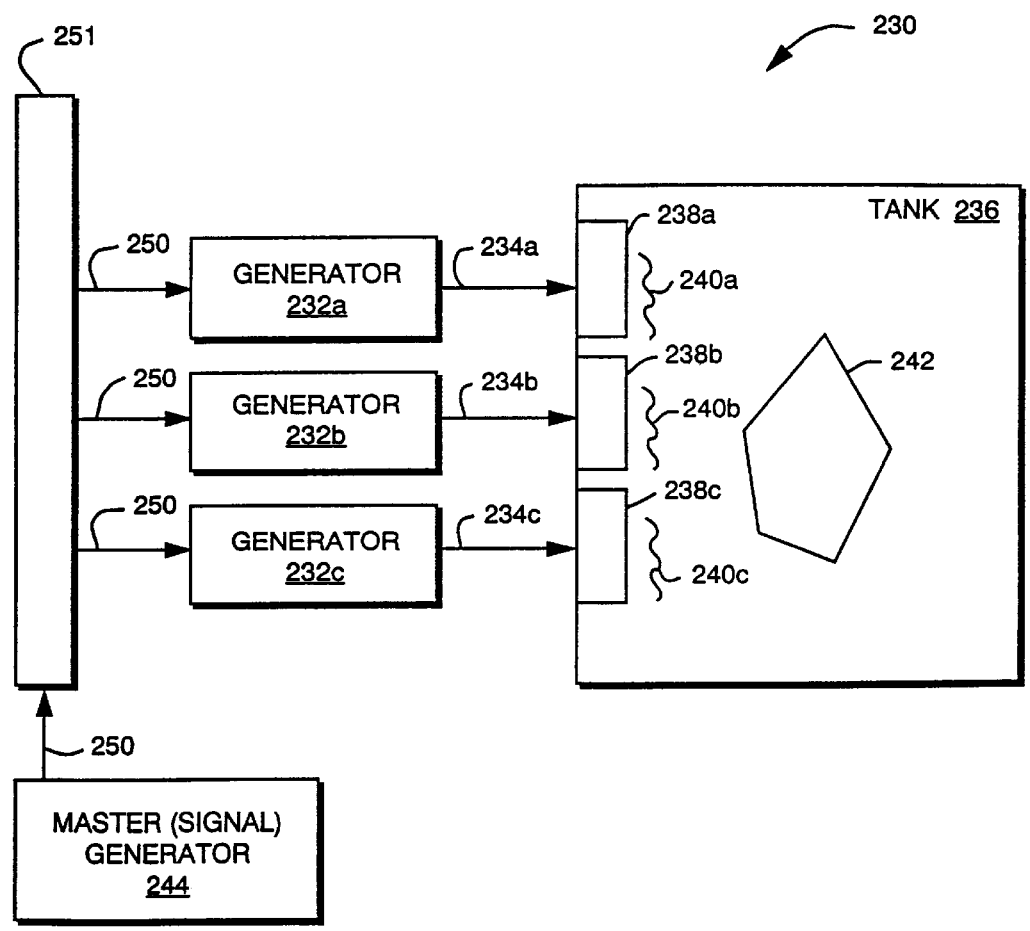
FIG. 10 illustrates a multi-generator, common-frequency, single tank ultrasound system constructed according to the invention.

FIG. 10 illustrates a multi-generator, common frequency ultrasound system 230 constructed according to the invention. In FIG. 10, a plurality of generators 232 (232a–232c) connect through signal lines 234 (234a–234c) to drive associated transducers 238 (238a–238c) in a common tank 236. Each of the transducers 238 and generators 232 operate at the same frequency, and are preferably swept through a range of frequencies such as described above so as to reduce or eliminate resonances within the tank 236 (and within the part 242).

In order to eliminate "beating" between ultrasound energies 240a–240c of the the several transducers 238a–238c and generators 232a–232c, the generators 232 are each driven by a common FM signal 250 such as generated by the master signal generator 244. The FM signal is coupled to each generator through signal divider 251.

In operation, system 230 permits the coupling of identical frequencies, in magnitude and phase, into the tank 236 by the several transducers 238. Accordingly, unwanted beating effects are eliminated. The signal 250 is swept with FM control through the desired ultrasound bandwidth of the several transducers to eliminate resonances within the tank 236; and that sweep rate frequency is preferably swept to eliminate any low frequency resonances which can result from the primary sweep frequency.

Those skilled in the art should appreciate that system 230 of FIG. 10 can additionally include or employ other features such as described herein, such as AM modulation and sweep, AM control, and broadband transducer.

Figure 11:
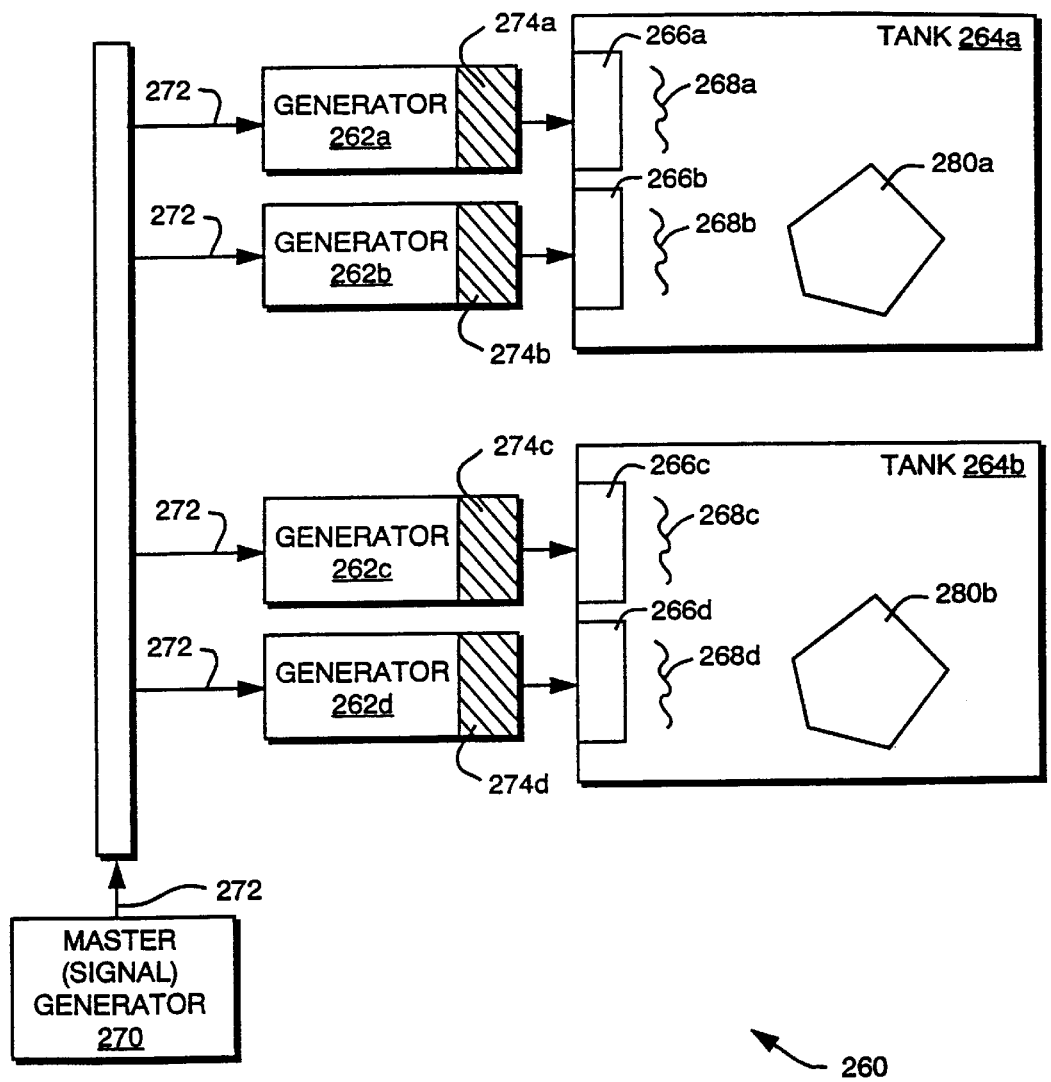
FIG. 11 illustrates a multi-tank ultrasound system constructed according to the invention.

FIG. 11 illustrates a multi-tank system 260 constructed according to the invention. One or more generators 262 drive each tank 264 (here illustrated, generators 262a and 262b drive tank 264a; and generators 264c and 264d drive tank 264b). Each of the generators 262 connects to an associated ultrasound transducer 266a–d so as to produce ultrasound 268a–d in the associated tanks 264a–b.

The common master signal generator 270 provides a common FM signal 272 for each of the generators 262. Thereafter, ultrasound generators 262a–b generate ultrasound 268a–b that is identical in magnitude and phase, such as described above. Similarly, generators 262c–d generate ultrasound 268c–d that is identical in magnitude and phase. However, unlike above, the generators 262 each have an AM generator 274 that functions as part of the generator 262 so as to select an optimum AM frequency within the tanks 264. In addition, the AM generators 274 preferably sweep through the AM frequencies so as to eliminate resonances at the AM frequency.

More particularly, generators 274a–b generate and/or sweep through identical frequencies of the AM in tank 264a; while generators 274c–d generate and/or sweep through identical frequencies of AM in tank 264b. However, the AM frequency and/or AM sweep of the paired generators 274a–b need not be the same as the AM frequency and/or AM sweep of the paired generators 274c–d. Each of the generators 274 operate at the same carrier frequency as determined by the FM signal 270; however each paired generator set 274a–b and 274c–d operates independently from the other set so as to create the desired process characteristics within the associated tank 264.

Accordingly, the system 260 eliminates or prevents undesirable cross-talk or resonances between the two tanks 264a–b. Since the generators within all tanks 264 operate at the same signal frequency 270, there is no effective beating between tanks which could upset or destroy the desired cleaning and/or processing characteristics within the tanks 264. As such, the system 260 reduces the likelihood of creating damaging resonances within the parts 280a–b. It is apparent to those skilled in the art that the FM control 270 can contain the four AM controls 274a–d instead of the illustrated configuration.

Figure 11A:
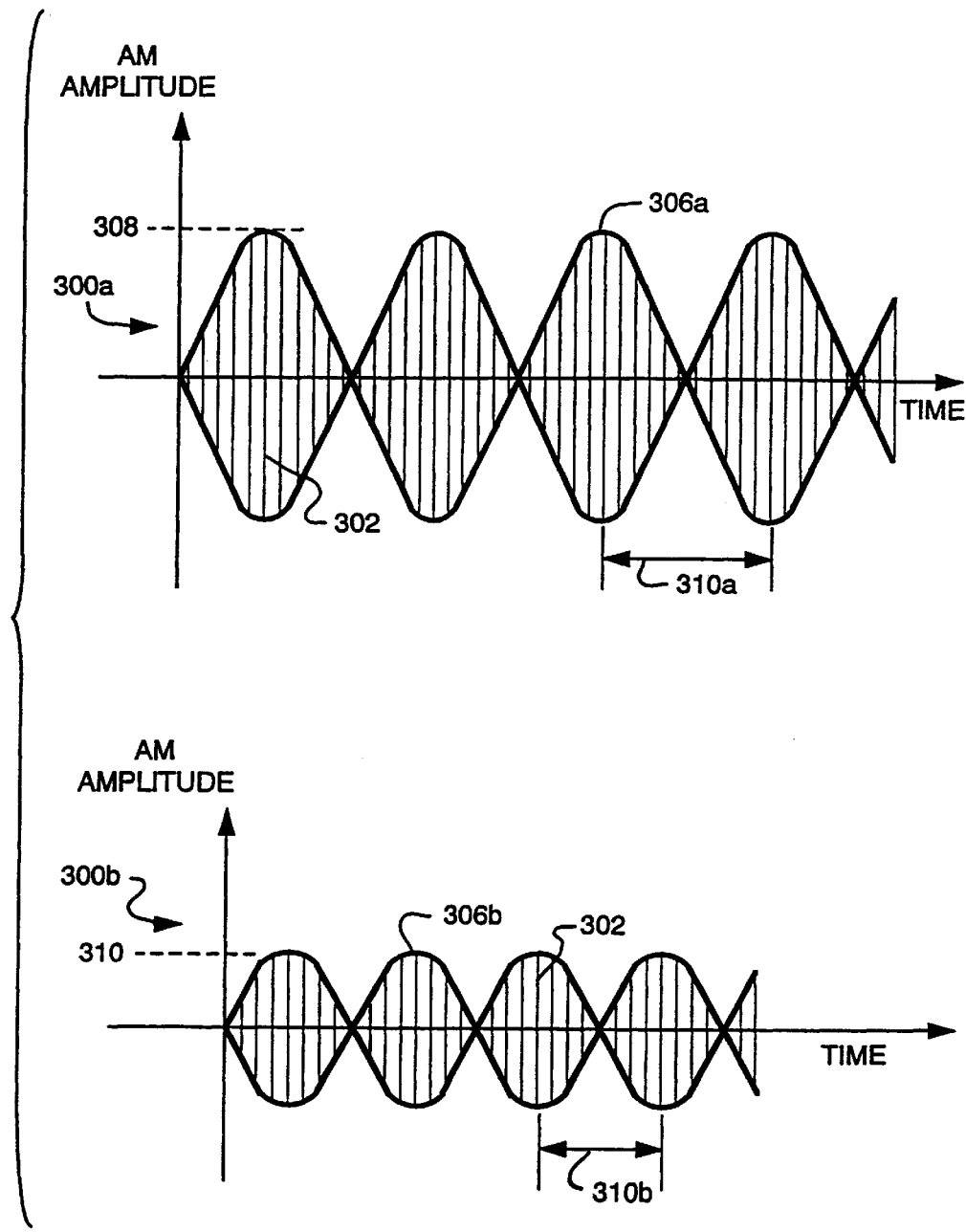

FIG. 11A shows two AM patterns 300a, 300b that illustrate ultrasound delivered to multiple tanks such as shown in FIG. 11. For example, AM pattern 300a represents the ultrasound 268a of FIG. 11; while AM pattern 300b represents the ultrasound 268c of FIG. 11. With a common FM carrier 302, as provided by the master generator 270, FIG. 11, the ultrasound frequencies 302 can be synchronized so as to eliminate beating between tanks 264a, 264b. Further, the separate AM generators 274a and 274c provide capability so as to select the magnitude of the AM frequency shown by the envelope waveform 306. As illustrated, for example, waveform 306a has a different magnitude 308 as compared to the magnitude 310 of waveform 306b. Further, generators 374a, 374c can change the periods 310a, 310b, respectively, of each of the waveforms 306a, 306b selectively so as to change the AM frequency within each tank.

Figure 12A:
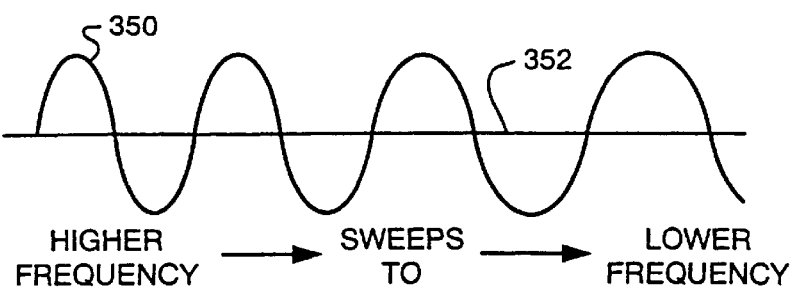
FIGS. 12A, 12B and 12C graphically illustrate methods of sweeping the sweep rate in accord with the invention.
Figure 12B:
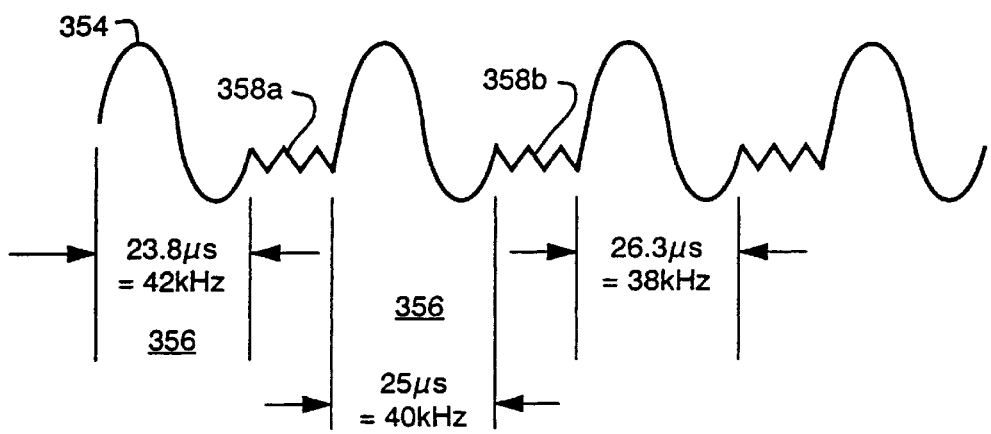
Figure 12C:
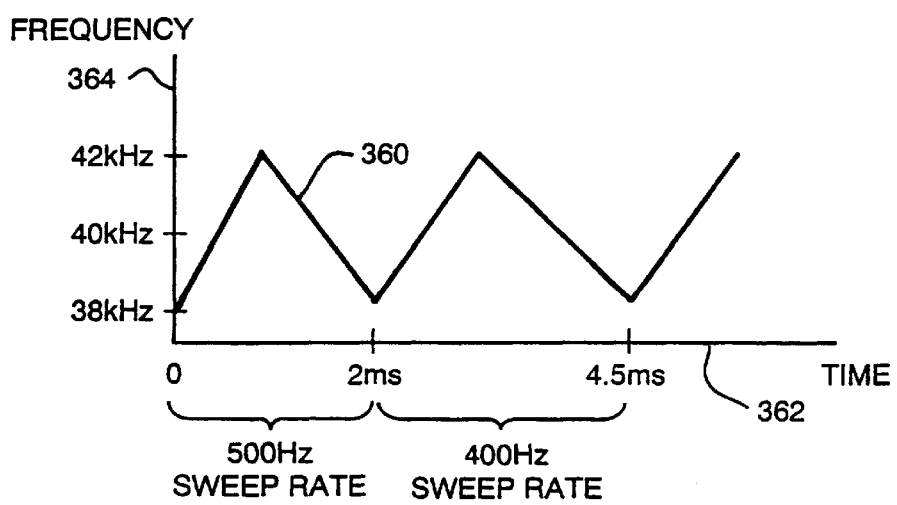

FIGS. 12A, 12B and 12C graphically illustrate the methods of sweeping the sweep rate, in accord with the invention. In particular, FIG. 12A shows an illustrative condition of a waveform 350 that has a center frequency of 40 khz and that is varied about the center frequency so as to "sweep" the frequency as a function of time along the time axis 352. FIG. 12B illustrates FM control of the waveform 354 which has a varying period 356 specified in terms of time. For example, a 42 khz period occurs in 23.8 μs while a 40 khz period occurs in 25 μs. The regions 358a, 358b are shown for ease of illustration and represent, respectively, compressed periods of time within which the system sweeps the waveform 354 through many frequencies from 42 khz to 40 khz, and through many frequencies from 40 khz to 38 khz.

FIG. 12c graphically shows a triangle pattern 360 which illustrates the variation of sweep rate frequency along a time axis 362.

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

It is also to be understood that the following claims are to cover all generic and specific features of the invention described herein, and all statements of the scope of the invention which, as a matter of language, might be said to fall there between.

Having described the invention, what is claimed as new and secured by letters patent is:

1. A system for delivering ultrasound to liquid, comprising:
   one or more ultrasonic transducers, each transducer having an operating frequency within an ultrasound bandwidth; and
   an ultrasound generator means for driving the transducers at frequencies within the bandwidth, the generator being amplitude modulated at a modulation frequency and having AM frequency sweep means for sweeping the modulation frequency as a function of time, the generator means and transducers being constructed and arranged so as to produce amplitude modulated ultrasound within the liquid.

2. A system according to clam 1, wherein the AM frequency sweep means comprises means for providing an AM sweep rate between about 1 hz and 100 hz.

3. A system according to clam 1, further comprising clamping means for appylying compression to at least one of the transducers.

4. A system according to clam 1, wherein the operating frequency is a harmonic frequency between about 100 khz and 350 khz.

5. A system according to claim 1, wherein the generator means comprises two or more ultrasound generators that are synchronized in magnitude and phase so that there is substantially zero frequency difference between signals generated by the generators.

6. A system according to claim 5, further comprising timing means for generating a timing signal between the generators to synchronize the signals.

7. A system according to claim 5, further comprising FM means for generating a master frequency modulated signal to each generator to synchronize the signals from the generators.

8. A system according to claim 1, further comprising a chamber for holding the solution so as to clean or process objects therein.

9. A system according to claim 8, wherein the chamber comprises a material selected from the group of 316L stainless steel, 304 stainless steel, polytetrafluoroethylene, fluorinated ethylene propylene, polyvinylidine fluoride, perfluoroalkoxy, polypropylene, tantalum, teflon coated stainless steel, titanium, hastalloy, polyetheretherketone, and mixtures thereof.

10. A system according to claim 1, wherein one or more transducer comprises a transducer array.

11. A system according to claim 1, wherein each transducer comprises an array of ultrasound transducer elements, each element within the array being driven at substantially the same frequency as other elements within the same array.

12. A system according to claim 1, wherein each transducer comprises one of the first, second, third or fourth harmonics frequencies.

13. A method of delivering ultrasound to liquid, comprising the steps of generating a drive signal for one or more ultrasonic transducer arrays having an operating frequency within an operational bandwidth, amplitude modulating the drive signal at a modulation frequency, and changing the modulation frequency, selectively, so as to produce ultrasound within the liquid and to substantially eliminate resonances at the modulation frequency.

14. A system according to claim 1, the AM frequency sweep means being characterized by a modulation sweep rate, wherein the sweep rate is substantially constant such that the modulation frequency varies as a linear function of time.

15. A system according to claim 1, the AM frequency sweep means being characterized by a modulation sweep rate, wherein the modulation sweep rate is characterized by a further sweep rate, such that the modulation sweep rate varies as a predetermined function of time.

16. A system for delivering ultrasound to liquid, comprising:
   one or more ultrasonic transducers, each transducer having an operating frequency within an ultrasound bandwidth; and,
   an ultrasound generator means for driving the transducers at frequencies within the bandwidth, the generator being amplitude modulated at a modulating frequency, wherein the modulating frequency varies as a random function of time, the generator means and transducers being constructed and arranged so as to produce amplitude modulated ultrasound within the liquid.

17. A system for delivering ultrasound to a liquid, comprising:
   one or more transducers, each transducer having an operating frequency within an ultrasound bandwidth; and,
   an ultrasound generator means for driving the transducers at frequencies within the bandwidth, the generator being amplitude modulated at a continually changing modulation frequency, wherein the generator means and transducers produce amplitude modulated ultrasound with a non-constant modulation frequency within the liquid for the purpose of eliminating resonances that can be excited by a single amplitude modulation frequency.

18. A method according to claim 13, further including the step of sweeping modulation frequency at a sweep rate, wherein the sweep rate is substantially constant such that the modulation frequency varies as a linear function of time.

19. A method according to claim 13, further including the step of sweeping modulation frequency at a sweep rate, wherein the sweep rate is characterized by a further sweep rate, such that the modulation sweep rate varies as a predetermined function of time.

20. A method of delivering ultrasound to liquid, comprising the steps of generating a drive signal for one or more ultrasonic transducers, each transducer having an operating frequency within an ultrasound bandwidth, amplitude modulating the drive signal at a modulation frequency, wherein the modulating frequency varies as a random function of time, so as to produce amplitude modulated ultrasound within the liquid and to substantially eliminate resonances at the modulation frequency.

21. A method of delivering ultrasound to liquid, comprising the steps of generating a drive signal for one or more ultrasonic transducers, each transducer having an operating frequency within an ultrasound bandwidth, amplitude modulating the drive signal at a continually changing modulation frequency, so as to produce amplitude modulated ultrasound within the liquid and to substantially eliminate resonances that can be excited by a constant modulation frequency.

* * * * *